(12) United States Patent
Joo et al.

(10) Patent No.: US 12,281,015 B2
(45) Date of Patent: *Apr. 22, 2025

(54) CONTINUOUS MANUFACTURE OF GRAPHENIC COMPOUNDS

(71) Applicant: CORNELL UNIVERSITY, Ithaca, NY (US)

(72) Inventors: Yong Lak Joo, Ithaca, NY (US); Mohammed Alamer, Ithaca, NY (US); Brian Williams, Ithaca, NY (US)

(73) Assignee: Cornell University, Ithaca, NY (US)

(*) Notice: Subject to any disclaimer, the term of this patent is extended or adjusted under 35 U.S.C. 154(b) by 756 days.

This patent is subject to a terminal disclaimer.

(21) Appl. No.: 17/284,219

(22) PCT Filed: Oct. 9, 2019

(86) PCT No.: PCT/US2019/055469
§ 371 (c)(1),
(2) Date: Apr. 9, 2021

(87) PCT Pub. No.: WO2020/077004
PCT Pub. Date: Apr. 16, 2020

(65) Prior Publication Data
US 2021/0340013 A1 Nov. 4, 2021

Related U.S. Application Data

(60) Provisional application No. 62/743,922, filed on Oct. 10, 2018.

(51) Int. Cl.
*C01B 32/19* (2017.01)
*B01J 19/02* (2006.01)
*B01J 19/28* (2006.01)

(52) U.S. Cl.
CPC ............. *C01B 32/19* (2017.08); *B01J 19/02* (2013.01); *B01J 19/28* (2013.01);
(Continued)

(58) Field of Classification Search
CPC ...... C01B 32/225; B01J 19/1887; B01J 19/28; B01J 2219/00029; C01P 2002/72; C01P 2002/82

See application file for complete search history.

(56) References Cited

U.S. PATENT DOCUMENTS

2017/0334726 A1* 11/2017 Hong .................. B08B 3/08
2019/0112195 A1* 4/2019 Pei .................... C01B 32/205

FOREIGN PATENT DOCUMENTS

| CN | 105271210 B | 4/2017 |
| KR | 20150096899 A | 8/2015 |

(Continued)

OTHER PUBLICATIONS

Paton, Keith R., et al. "Scalable production of large quantities of defect-free few-layer graphene by shear exfoliation in liquids." Nature materials 13.6 (2014): 624-630.*

(Continued)

*Primary Examiner* — Richard M Rump
(74) *Attorney, Agent, or Firm* — Young Basile Hanlon & MacFarlane, P.C.

(57) ABSTRACT

Provided herein are high throughput continuous or semi-continuous reactors and processes for manufacturing graphenic materials, such as graphene. Such processes are suitable for manufacturing graphenic materials at rates that are up to hundreds of times faster than conventional techniques, and have little batch-to-batch variation. Also provided herein are graphenic compositions of matter, including large, high quality and/or highly uniform graphene.

55 Claims, 13 Drawing Sheets

(52) U.S. Cl.
CPC ............. *B01J 2219/00033* (2013.01); *B01J 2219/0254* (2013.01); *B01J 2219/0286* (2013.01); *B01J 2219/0295* (2013.01); *B01J 2219/1943* (2013.01); *C01B 2204/04* (2013.01); *C01B 2204/30* (2013.01); *C01B 2204/32* (2013.01); *C01P 2002/72* (2013.01); *C01P 2002/78* (2013.01); *C01P 2002/82* (2013.01); *C01P 2004/03* (2013.01)

(56) References Cited

FOREIGN PATENT DOCUMENTS

| KR | 20150109505 | A |   | 10/2015 |           |
|----|-------------|---|---|---------|-----------|
| KR | 20180074102 | A | * | 7/2018  | C01B 32/23 |
| WO | 2016/208884 | A1 |  | 12/2016 |           |
| WO | 2017/125819 | A1 |  | 7/2017  |           |

OTHER PUBLICATIONS

English machine translation of KR101573384B1 (2014).*
Lee, Sooyun, Choul-Ho Lee, and Woo-Sik Kim. "Anti-solvent crystallization of L-threonine in Taylor crystallizers and MSMPR crystallizer: Effect of fluid dynamic motions on crystal size, shape, and recovery." Journal of Crystal Growth 469 (2017): 119-127.*
Li, Yan, et al. "Optimization of three-roll mill parameters for in-situ exfoliation of graphene." MRS advances 1.19 (2016): 1389-1394.*
Kang, Bong Kyun, et al. "Synthesis and characterization of a mesoporous and three dimensional N-doped graphene structure via the Couette-Taylor flow and hydrothermal method." Journal of the European Ceramic Society 37.12 (2017): 3673-3680.*
Xu, Changyan, et al. "Fabrication and characteristics of reduced graphene oxide produced with different green reductants." PloS one 10.12 (2015): e0144842.*
Tran, Tuan Sang. "Shear flow exfoliation of Graphite into high-quality Graphene." (2016).*
Marcano, D., "Improved Synthesis of Graphene Oxide," American Chemical Society, vol. 4, No. 8, 2010, all enclosed pages cited.
Park, W.K., et al., "Facile synthesis of graphene oxide in a Couette-Taylor flow reactor," Carbon, 2015, vol. 83, all enclosed pages cited.
Park Won Kyu et al: "Facile synthesis of graphene oxide in a Couette-Taylor flow rea", Carbon, Elsevier Oxford, GB, vol. 83, Nov. 20, 2014 (Nov. 20, 2014), all enclosed pages cited.
Tuan Sang Tran et al: "High shear-induced exfoliation of graphite into high quality graphene by Taylor Couette flow", RSC Adv., vol. 6, No. 15, Jan. 1, 2016 (Jan. 1, 2016), all enclosed pages cited.
Kang Bong Kyun et al: "Synthesis and characterization of a mesoporous and three dimensional N-doped graphene structure via the Couette-Taylor flow and hydrothermal method", Journal of the European Ceramic Society, Elsevier, Amsterdam, NL, vol. 37, No. 12, Mar. 9, 2017 (Mar. 9, 2017), all enclosed pages cited.

* cited by examiner

CONTINUOUS MANUFACTURE OF GRAPHENIC COMPOUNDS

CROSS-REFERENCE

This patent application is a U.S. national phase entry of International Application No PCT/US2019/055469 filed Oct. 9, 2019, which claims the benefit of U.S. Provisional Patent Application No. 62/743,922, filed Oct. 10, 2018, which are incorporated herein by reference in their entirety.

BACKGROUND OF THE INVENTION

Batch processes are typically utilized in the manufacture of graphenic compounds, including graphene oxide. Hummers' method utilizing $KMnO_4$, $NaNO_3$, and $H_2SO_4$ in a batch process is one of the more common method used for preparing graphene oxide (GO). Another common batch process for manufacturing graphene oxide is the Tour method, which excludes the use of $NaNO_3$, and increases the amount of $KMnO_4$. According to Tour ("Improved Synthesis of Graphene Oxide," ACS Nano, 2010, 4(8), 4806-14), the Tour process provides a greater amount of hydrophilic oxidized graphene material as compared to Hummers' method or Hummers' method with additional $KMnO_4$. According to Tour, the GO produced by the Tour method is more oxidized than that prepared by Hummers' method. Following collection of GO, it can be reduced to form reduced graphene oxide (rGO). Graphene is also manufactured used costly and slow chemical vapor deposition techniques.

SUMMARY OF THE INVENTION

The use of graphenic compounds manufactured in batch processes have limited potential in commercial applications, particularly high tech application that require high throughput processes that yield very consistent materials and materials characteristics. Batch-to-batch variability of the graphenic compounds produced by such methods leads to inconsistency in graphenic products and makes quality control of products produced using such components difficult or impossible.

In addition, batch processes take a long time to complete and are difficult to scale because small batch reactions don't necessarily scale to large batch reactions. For example, product inconsistencies can arise for a number of reasons, such as a greater number of local effects during the reaction (e.g., lesser or greater exposer to any one or more reagent). Moreover, scaling to large batch reactions leads to the production of large batches of graphenic suspensions that often are not stable (e.g., with phase separation occurring). In some instances, graphenic suspensions may be processed to form dried or isolated graphenic materials, but such drying and/or isolation techniques can change the material properties and characteristics of the graphenic compounds relative to the suspended products.

Moreover, such batch processes typically use strongly oxidative conditions which, over time, causes the large sheets of the graphite to be significantly reduced in size, typically producing submicron graphenic sheets. Other methods of manufacturing graphenic compounds, such as chemical vapor deposition are extremely expensive and slow, but can be used to produce graphenic sheets that are larger than those typically produced by the Hummer and Tour methods, as well as variants thereof. However, such CVD methods are generally only able or used to produce sheets up to a few microns in size.

Provided in certain embodiments herein are processes and systems for manufacturing graphenic components, such as graphene, including single layer graphene and/or multi-layered graphene. In specific embodiments, the processes provided herein are continuous or semi-continuous (flow) processes. In certain instances, processes provided herein facilitate greatly improved (reduced) manufacturing times for graphenic products. Moreover, in some instances, processes provided herein facilitate greater control of reactor conditions, including shearing conditions, of the processes thereof, providing greater control of and greater quality control of resulting graphenic products. For example, in certain embodiments, provided herein are processes that are utilized to control the number of layers, the lateral dimension, other characteristics, or combinations thereof of graphenic products produced thereby. In additional instances, with the ability to precisely control flow, fluid dynamics, and inputs characteristics, timing and location, greater quality control of the resultant products is achieved, whether the graphenic product is first out, last out, somewhere in-between, or even during a different run or using a separate but similar system.

In specific embodiments, provided herein is a process for manufacturing a graphenic compound (e.g., graphene), the process comprising:
  a. injecting a first stock into a first inlet of a continuous or semi-continuous reactor, the first stock comprising graphite;
  b. collecting the graphenic compound (e.g., graphene) from an outlet of the continuous reactor, the graphenic compound being collected downstream from the injection points of the first stock.

In certain embodiments, the continuous or semi-continuous reactor comprises a reaction chamber into which the stock(s) are injected, the reactor chamber being configured between an outer wall of a first body and an inner wall of a second body. In specific embodiments, the outer wall of the first body defines a cylindrical body and the inner wall of the second body defines a cylindrical bore. In some embodiments, the first body (or outer wall thereof) is configured to rotate (e.g., relative to the second body outer wall). In certain embodiments, the wall(s) of the cylindrical body and/or bore rotate(s) around an axis of the respective cylinder body and/or bore. The cylindrical body and/or bore form any suitable shape, such as a circular cylinder, an elliptical cylinder, a right cylinder, an oblique cylinder, or the like. In certain embodiments, the cylindrical bore and/or body is optionally substituted with conical frustum bore and/or body, respectively. In certain embodiments, the ratio of the (e.g., average) diameter of the cylinder bore formed by the inner wall of the outer body to the diameter of the cylinder body formed by the outer wall of the inner body is about 100:50 to about 100:99.9, such as about 100:80 to about 100:99 or about 100:85 to about 100:95.

In certain preferred embodiments, the cylindrical body and the cylindrical bore are both circular cylinders. In specific embodiments, the inner cylindrical body rotates, while the outer body (defining the bore) is motionless. However, in certain instances, preferred flow characteristics (e.g., stable, laminar, non-vortex, and/or Couette flow) are limited using such a configuration (e.g., to low rotation speed and/or low shear). In some preferred embodiments, the outer body, or wall thereof, (defining the bore) is configured to rotate, facilitating the ability to achieve preferred flow characteristics (e.g., stable, laminar, non-vortex, and/or Couette flow) at much higher rotation speeds and/or shear, facilitating greater production rate and/or conversion. In certain preferred embodiments, the cylindrical body is an elliptical (oval) cylinder and the cylindrical bore is a circular cylinder. In some instances, such a configuration facilitates improved shear, such as when the inner body rotates (e.g., and the outer bore is stationary).

In certain embodiments, high shear rate of a flow provided herein has a shear rate of at least 100/s, at least 500/s, at least 1,000/s, at least 2,000/s, or the like.

In specific instances, a continuous reactor is a reactor that continues to produce product (e.g., which is ejected from the reactor via the output thereof) so long as starting material and reactants continue to be provided to the reactor (e.g., the input(s) thereof). In other specific instances, a semi-continuous or semi-batch reactor is a reactor that has an input and an output, with a flow there-between, wherein after an initial stock of starting material is provided to the input—the output feeds back into the input until the reaction is completed or terminated.

In certain embodiments, a reactor provided herein has a (e.g., fluid) flow (e.g., within the chamber thereof) from an input to an output. In other words, one or more fluid stock (e.g., solutions, suspensions, or combinations thereof) is input into the reactor via one or more inlet, such one or more fluid stocks mixing and flowing toward and out of one or more outlet, at least one outlet being down-flow ("downstream") from the one or more inlet. In various embodiments, any suitable flow is provided within the reactor (e.g., chamber thereof), such as a toroidal or helical flow (e.g., around a cylinder or the axis of the cylinder or bore, such as in the reactor's lateral dimension or direction) (e.g., toroidal or helical flow can comprise vortex or non-vortex flow), a vortex flow (e.g., a toroidal vortex flow or a Taylor vortex flow), a laminar flow (e.g., Couette flow), a (e.g., azimuthal) shear, non-vortex and/or non-turbulent flow (such as, e.g., a Couette flow), a turbulent flow, and/or the like. In some embodiments, the fluid has a toroidal flow (e.g., a flow around an axis (lateral flow), wherein the flow does not intersect or otherwise come in contact with the axis (e.g., and an area surrounding the axis, such as forming a "hole" in the center of the flow). In some instances, a toroidal flow comprises an axial flow directional component, such as wherein the flow progresses not just around the axis (lateral flow), but along the axis as well (axial flow). In some embodiments, the flow (e.g., toroidal flow) provided herein is a helical flow, such as having flow direction both around an axis (lateral flow) and along the axis (axial flow). In specific embodiments, the fluid has a stable, azimuthal, shear, laminar, non-vortex, and/or Couette flow. In some embodiments, a reactor provided herein is configured to provide a vortex flow, e.g., toroidal vortex flow, within a reactor chamber thereof. In certain embodiments, the flow is a modified Couette flow (lateral (around the center cylinder or axis thereof) and axial (along the length of and/or axis of the cylinder/bore) flow—such as forming a helical flow configuration) and/or the reactor is a continuous Taylor-Couette reactor. In specific embodiments, the flow dynamics are configured by adjustment of flow rate, drum size, bore size, gap between the inner wall and the outer wall, rotation speed, or any combination thereof. For example, in some instances, the vortices (vortexes) are generated if the Taylor Number, Ta (e.g., calculated according to any suitable metric, depending on the configuration, such as wherein Ta is equal to $\Omega^2 R_1 (R_2-R_1)^3/v^2$, wherein $\Omega$ is the angular velocity, v is the kinematic viscosity, $R_1$ is the external radius of an inner cylinder, and $R_2$ is an internal radius of an external cylinder (bore)) exceeds a critical value, $Ta_c$ (calculated according to any suitable metric, such as depending on configuration, such as $\gtrsim 1700$). In some instances, variations of such calculations are contemplated for variances herein, such as in continuous systems, rotation of outer cylinders vs inner cylinders, etc.

In some instances, given the continuous or semi-continuous nature of a reactor provided herein, such flows are modified to account for the flow of the fluid axially along the length of the reactor (e.g., forming a helical flow). In specific embodiments, the flow is a helical, laminar, shear or Couette flow (e.g., flowing around a cylindrical body from an inlet at a first axial position (e.g., along the body, bore and/or reactor) toward an outlet at a second axial position (e.g., along the body, bore and/or reactor)). In certain embodiments, the helical, toroidal flow comprises no vortexes therein. In some embodiments, the helical, toroidal flow comprises a stable, shear, Couette and/or laminar flow (e.g., comprising no vortexes).

In certain embodiments, rotation speed of the bodies, surfaces, walls, or the like of a cylinder provided herein is at any suitable speed, such as to provide the desired flow characteristics. In specific embodiments, the outer body or surface thereof is able to rotate at much higher speed and maintain non-vortex flow conditions. In some embodiments, rotation speeds (e.g., of an outer cylinder body or surface thereof) are at least 1000 rpm, at least 1200 rpm, at least 1400 rpm, at least 1500 rpm, or the like.

In specific embodiments, provided herein is a process or system for manufacturing a graphenic compound (e.g., graphene), the process comprising:
a. injecting a first (graphitic) stock into a first inlet of a (e.g., continuous or semi-continuous) reactor, the first stock comprising graphite (e.g., and an additive, such as a surfactant, dispersant, thickener, and/or dispersant);
b. collecting the graphenic compound (e.g., graphene) from an outlet of the continuous reactor, the graphenic compound (e.g., graphene) being collected downstream from the injection points of the first stock.

In some embodiments, a stock or process provided herein is aqueous, such as wherein graphite is suspended in an aqueous medium. Some conventional techniques for manufacturing graphenic materials require the use of very strong acids, oxidizing agents, and/or organic solvents, which, in some instances, are not required herein. Use of such materials generally require expensive and time-consuming recovery processes because such materials can be extremely toxic. By contrast, use of aqueous systems herein facilitate an environmentally friendly process that has reduced costs and need for recycling. In some embodiments, an aqueous or water-comprising stock is injected at an elevated temperature (the stock and/or reactor has an elevated temperature). In certain instances, the temperature is at least 50 C, e.g., at least 60 C, at least 70 C, or the like.

In certain embodiments, (e.g., graphite) stocks provided herein comprise additives, such as to facilitate good dispersion of graphite therein. In certain instances, good dispersion of graphite is required in order to facilitate good and even shear to the graphitic materials, thereby facilitating good exfoliation of the graphenic sheets thereof. In certain embodiments, a stock provided herein comprises a surfactant or stabilizing agent, such as, by way of non-limiting example, a pluronic (block copolymers comprising polyethylene oxide and/or polkypropylene oxide blocks, such as F68, F127, etc.), a poloxamer, xanthan gum, sodium dodecyl sulfate (SDS), Triton X-100, polysorbates (e.g., TWEEN®

20 or TWEEN® 80), propylene glycol, polyoxyethylene 20 cetyl ether, cremophor EL, cetyl trimethylammonium bromide (CTAB), methyl cellulose, hydroxy propyl methyl cellulose (HPMC), guar gum, combinations thereof, or the like.

In certain embodiments, a process provided herein comprises collecting an output product from the reactor, separating at least a portion of the graphene in the output product from graphite (e.g., at least a portion of which may have undergone at least partial exfoliation). In specific embodiments, the separation is a phase separation achieved, e.g., by allowing the output product to rest (e.g., producing a top phase comprising graphene and a bottom phase comprising graphite). In some instances, the bottom phase further comprises graphene which may be further separated from the graphite. In certain instances, the graphene is collected from the output product and any residual graphite is recovered and subjected to the reactor or process herein again to improve graphite to graphene conversion yield.

Also, provided in certain embodiments herein are processes for manufacturing a graphenic component (e.g., graphene), the process comprising injecting a first stock into a toroidal flow or subjecting a first stock to a toroidal flow, the first stock comprising graphite (e.g., and collecting the graphenic component). In specific embodiments, the toroidal flow is a azimuthal, stable, shear, laminar, and/or Couette flow. Other descriptions and optional parameters of such stocks are as described for any process herein.

Provided in certain embodiments herein are any reactors or reactor systems suitable for performing the processes described herein.

In some embodiments, provided herein is a continuous or semi-continuous reactor or reactor system comprising:
a. an inner (e.g., cylindrical) body, the inner body comprising an outer wall;
b. an outer body, the outer body comprising an inner wall, the inner wall defining a (e.g., cylindrical) bore, the inner body being configured within the bore (e.g., at least partially within the bore—for example, in some instances, the inner body is longer than the bore);
c. a reaction chamber, the reaction chamber being configured between the outer wall of the inner body and the inner wall of the outer body;
d. a first inlet, the first inlet being configured in fluid communication with the reaction chamber; and
e. a first outlet, the first outlet being configured in fluid communication with the reaction chamber (e.g., and configured at a different axial position (e.g., downstream) from the first inlet).

In some embodiments, the reactor or reactor system further comprises one or more motor configured to rotate one or more body of reactor (e.g., inner and/or outer body thereof).

In certain embodiments, the reactor system further comprises one or more pump, such as a pump configured to inject a fluid (e.g., a graphite stock fluid, or an acid stock fluid) to one or more inlet of the reactor or reactor system. In specific embodiments, the reactor system comprises a pump configured to pump a graphitic stock into the reaction chamber via the first inlet.

In some embodiments, the reactor or reactor system further comprises a collection vessel, such as configured to collect a product (e.g., a graphenic suspension or solution) ejected from the outlet. In certain embodiments, a reactor system comprises a plurality of reactor systems arranged in series, such as wherein the outlet of one reactor feeds into the inlet of a subsequent reactor in the series. In some instances, a flow reactor provided herein is optionally configured in combination with (e.g., in series with) another type of reactor, such as a stirred tank reactor, or the like.

In various embodiments, the reactor or reactor system components are comprised of any suitable material. By way of non-limiting example, the inner and/or outer body (or surface thereof) independently is or comprises any one or more of the following: a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium-molybdenum-tungsten alloy (e.g., Alloy 22), stainless steel with silicon, a Ni—Fe—Cr—Mo alloy (e.g., Alloy 20, Alloy G-30, Alloy 33, Cronder 2803 Mo), a Ni—Cr—Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), and/or ductile iron (e.g., MONDI).

In certain embodiments, a reactor system provided herein comprises a temperature control body configured in at least partially surrounding relation all or part of the reaction chamber. In some instances, the temperature control body is a cooling jacket (e.g., hollow jacket comprising a coolant), a heating jacket (e.g., electric heating jacket or a hollow jacked comprising a heated fluid), a cooling coil (e.g., hollow coil comprising a coolant), a heating coil (e.g., electric heating coil or a hollow coil comprising a heated fluid), or the like.

In certain instances, graphenic components are provided and described herein. In general, a graphenic component is a two-dimensional, sheet-like or flake-like carbon form that comprises monolayer graphenes, as well as multi-layer graphenes (e.g., graphenes comprising 1 up to about 40 graphenic layers, such as 1 to about 25 or 1 to about 10 graphenic layers (sheets)), as opposed to three dimensional carbon structures, such as graphite, and one dimensional structures, such as carbon nanotubes (CNTs), and zero dimensional structures, such as C60 buckyball. A pristine graphenic layer is a single-atom-thick sheet of hexagonally arranged, sp2-bonded carbons atoms occurring within a carbon material structures, regardless of whether that material structure has a 3D order (graphitic) or not. As discussed herein, graphenic components optionally comprise pristine and/or defective or functionalized graphenic layers. For example, defective graphene layers may be optionally functionalized, such as described herein. In some instances, graphene layers are functionalized with oxygen and/or other moieties. For example, graphene oxide is an oxygen functionalized graphene or a chemically modified graphene prepared by oxidation and exfoliation that is accompanied by extensive oxidative modification of the basal plane. Herein, graphene oxide is a single or multi-layered material with high oxygen content, such as characterized by C/O atomic ratios of less than 3.0, such as about 2.0. Reduced graphene oxide (rGO) is graphene oxide that has been reductively processed by chemical, thermal, microwave, photo-chemical, photo-thermal, microbial/bacterial, or other method to reduce the oxygen content. Oxygen content of rGO isn't necessarily zero, but is typically lower than the oxygen content of graphene oxide, such as having a C/O atomic ratio of over 3.0, such as at least 5, at least 10, at least 20, or the like. In certain instances, graphene layers of rGO are less pristine than that of graphene, such as due to imperfect reduction and assembly of the two-dimensional structure.

In some embodiments, provided herein is a graphenic compound (e.g., graphene) or composition comprising a plurality of graphenic compounds having a two dimensional structure, the two dimensional structure(s) having a (e.g., average) lateral dimension of at least 10 micron ($\mu$m) (e.g., at least 20 micron). In certain embodiments, the two dimensional structure(s) has a (e.g., average) lateral dimension of at least 25 micron. In specific embodiments, the two dimensional structure(s) have a (e.g., average) lateral dimension of at least 30 micron. In certain embodiments, the two dimensional structure comprises greater than one graphenic layer (e.g., on average), such as at least two graphenic layers (e.g., on average). In some embodiments, the two dimensional structure(s) comprises 3 to 15 graphenic layers (e.g., on average). In some embodiments, the two dimensional structure comprises at least two graphenic layers (e.g., on average), and the average interlayer spacing of about 0.8 nm or more (e.g., on average). In some embodiments, the two dimensional structure(s) comprises at least two graphenic layers (e.g., on average), and the average interlayer spacing of about 0.8 nm to about 1.2 nm (e.g., on average). In certain embodiments, the two dimensional structure(s) comprises at least two graphenic layers (e.g., on average), and the average interlayer spacing of about 0.8 nm to about 1 nm (e.g., on average).

In certain instances, a value "about" an indicated value is a value suitable for achieving a suitable result and/or a result similar as achieved using the identified value. In some instances, a value "about" an indicated value is between ½ and 2 times the indicated value. In certain instances, a value "about" an indicated value is ±50% the indicated value, ±25% the indicated value, ±20% the indicated value, ±10% the indicated value, ±5% the indicated value, ±3% the indicated value, or the like.

These and other objects, features, and characteristics of the batteries, electrodes, materials, compositions and/or processes disclosed herein, will become more apparent upon consideration of the following description and the appended claims with reference to the accompanying drawings and examples, all of which form a part of this specification. It is to be expressly understood, however, that the drawings and examples are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided in certain embodiments herein are processes and systems for manufacturing graphenic components, such as graphene oxide, including single layer graphene oxide and/or multi-layered graphene oxide. Also provided herein are compositions used to make graphenic products described herein and/or the graphenic products produced or produceable by processes or from compositions described herein. In specific instances, the processes provided herein are continuous or semi-continuous (flow) processes. In certain instances, processes provided herein facilitate greatly improved (reduced) manufacturing times for graphenic products. Moreover, in some instances, processes provided herein facilitate greater control of the interaction between reagents of the processes thereof, providing greater control of and greater quality control of resulting graphenic products. For example, in certain embodiments, provided herein are processes that are utilized to control the degree of oxidation, the type of oxidation, the number of layers, the lateral dimension, other characteristics, or combinations thereof of graphenic products produced thereby. In addition, with the ability to precisely control flow, rotation/vortex parameters, and inputs characteristics, timing and location, greater quality control of the resultant products is achieved, whether the graphenic product is first out, last out, somewhere in-between, or even during a different run or using a separate system.

In specific embodiments, provided herein is a process for manufacturing a graphenic compound (e.g., graphene), the process comprising:
a. injecting a first stock into a first inlet of a continuous or semi-continuous reactor, the first stock comprising graphite;
b. collecting the graphenic compound (e.g., graphene) from an outlet of the continuous reactor, the graphenic compound being collected downstream from the injection points of the first stock.

In specific embodiments, the reactor having a fluid flowing therein, the flow having a flow type as described herein (e.g., laminar flow, toroid flow, or the like). In some instances, the fluid within the reactor comprises the first (graphite) stock, such as alone or in combination with one or more other fluid provided to the reactor.

Figure 12:
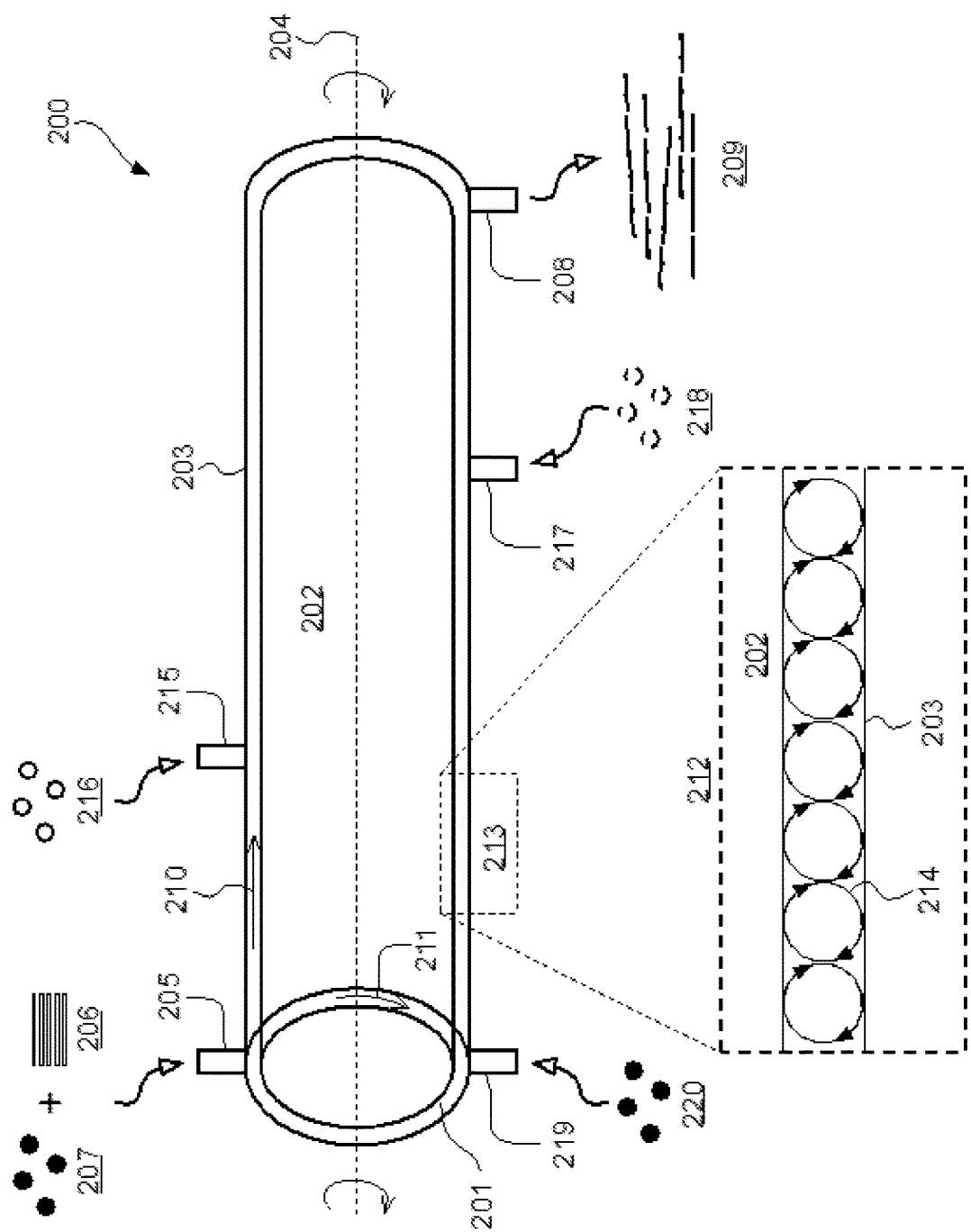
FIG. 12 illustrates a schematic of an exemplary toroidal flow reactor provided herein, with a variety of inlets and an outlet.

FIG. 12 illustrates an exemplary embodiment of a process and a reactor 200 provided herein. As illustrated, the reactor 200 comprises a reaction chamber 201 into which the stock(s) are injected, the reaction chamber 201 being configured between an outer wall of a first body 202 and an inner wall of a second body 203. In specific embodiments, the outer wall of the first body 202 defines a cylindrical body and the inner wall of the second body 203 defines a cylindrical bore. In some instances, the first body 202 and/or the second body 203 is configured to rotate about or around an axis 204 thereof. In certain embodiments, the wall(s) of the cylindrical body and/or bore rotate(s) around an axis of the respective cylinder body and/or bore. The cylindrical body and/or bore form any suitable shape, such as a circular cylinder, an elliptical cylinder, a right cylinder, an oblique cylinder, or the like. In certain embodiments, the cylindrical bore and/or body is optionally substituted with conical frustum bore and/or body, respectively. In various embodiments, the first body and the second body (e.g., inner and outer walls or surfaces thereof, respectively) comprise any suitable material.

Figure 3:
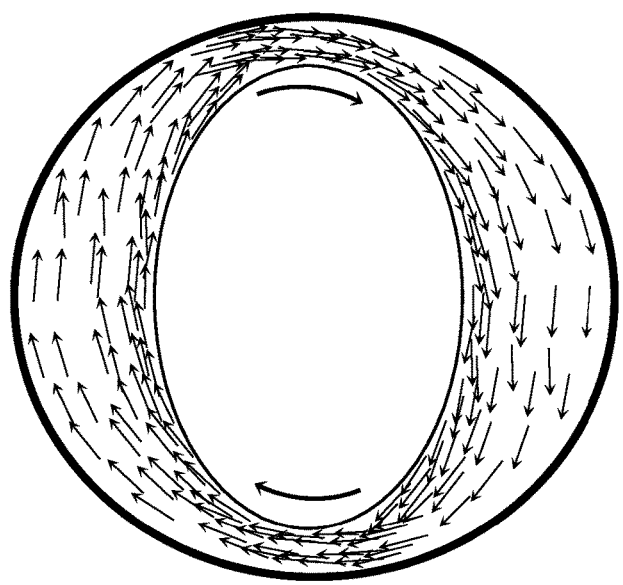
FIG. 3 illustrates the cross section of an exemplary reactor comprising a rotating elliptical cylindrical inner body (or surface thereof).
Figure 5:
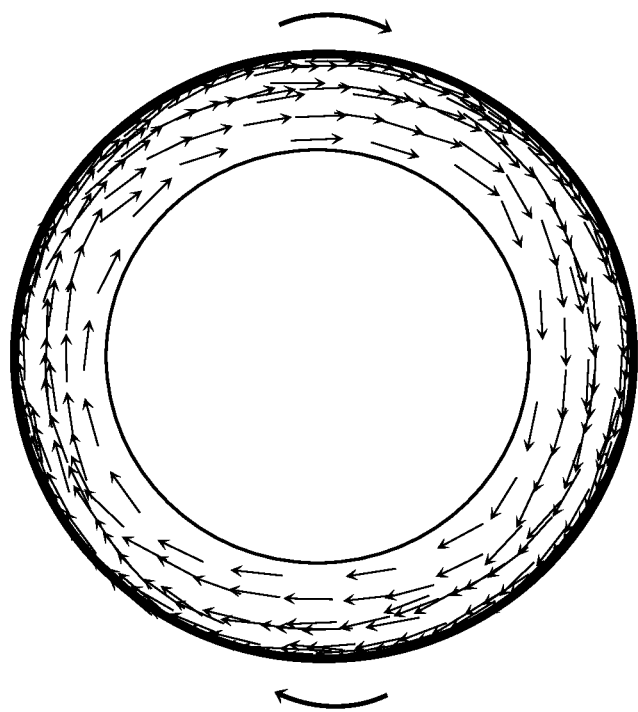
FIG. 5 illustrates the cross section of a reactor comprising a circular cylindrical inner body and a rotating circular cylindrical outer body (or surface thereof).

FIG. 3 illustrates the cross section of a reactor comprising a reaction chamber configured between the inner wall of a circular cylindrical outer (second body) and the outer wall of an elliptical cylindrical inner (first) body. As illustrated in FIG. 3, in some preferred embodiments, the inner cylindrical body of such a reactor rotates. In some instances, use of an elliptical inner body facilitates good (non-vortex) toroidal shear flow within the reactor, even at higher rotation speeds. By contrast, in some instances, use of a circular cylindrical inner body results in a non-vortex, toroidal shear flow only at low rotation speeds, with the shear flow quickly destabilizing to form a toroidal vortex flow. FIG. 5 illustrates the cross section of a reactor comprising a reaction chamber configured between the inner wall of a circular cylindrical outer (second) body and the outer wall of an cylindrical inner (first) body, as well as the lateral, toroidal flow of a fluid between the inner and outer walls. As illustrated in FIG. 5, in some preferred embodiments, the outer cylindrical body of such a reactor rotates. In some instances, rotation of the outer body facilitates good (non-vortex) toroidal shear flow within the reactor chamber, even at higher rotation speeds. By contrast, in some instances, rotation of the circular cylindrical inner body results in a non-vortex, toroidal shear flow only at low rotation speeds, with the shear flow quickly destabilizing to form a toroidal vortex flow.

In some embodiments, the first body and the second body (e.g., inner and outer wall or surfaces thereof, respectively) independently is or comprises a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium-molybdenum-tungsten alloy (e.g., Alloy 22), stainless steel with silicon, a Ni—Fe—Cr—Mo alloy (e.g., Alloy 20, Alloy G-30, Alloy 33, Cronder 2803 Mo), a Ni—Cr—Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), ductile iron (e.g., MONDI), any combination thereof, or the like.

As illustrated in FIG. 12, exemplary embodiments of the reactor have at least one inlet 205 configured to receive a stock, particularly a graphite stock (e.g., a stock comprising a graphite 206, such as in a suspension). In some instances, the graphite stock further comprises a surfactant and/or thickening agent (stabilizer) 207. The reactor further comprises at least one outlet 208, from which product is extracted from the reactor. In the case of a continuous flow reactor, the extracted product comprises the graphenic component (e.g., single or multi-layered graphene) 209. In the case of a semi-continuous or semi-batch reactor, the extracted product is injected back into the reactor one or more times until a graphenic component is ultimately collected from the reactor. In general, the reactor facilitates the (axial) flow 210 of the stock(s) and/or reagents from one or more inlet 205 of the reactor to one or more outlet 208 of the reactor 200. Moreover, with one or more of the inner cylinder or the inner surface of the bore cylinder rotating relative to the other, the flow has a toroidal and/or lateral aspect 211. Moreover, as illustrated in the expanded view 212 of the cut-out 213, the flow of the fluid within the reactor comprises, in some instances, a plurality of vortices (a vortex flow herein) 214. In some preferred embodiments, the rotation speed of the first and/or second bodies are maintained at a rate (e.g., that is slow enough) to prevent the destabilization of a non-vortex or shear flow, such as forming the vortices 214 in the expanded view of 213. In some instances, a batch reactor configured such as described herein can be configured to provide a plurality of stirred domains (e.g., the series of domains or vorticies can be considered a series of continuous stirred tank reactors) or vortices such as illustrated in the expanded view of 212, wherein each of the plurality of vortices have a toroidal shape. In certain instances, with the flow 210 of a continuous or semi-continuous reactor 200 herein, the toroidal shapes of the vortices 214 are distorted (e.g., forming distorted toroidal vortices), such as forming vortices with a helical shape (e.g., forming helical vortices).

In certain embodiments, a toroid provided herein is helical or a distorted toroid (e.g., having an axial and lateral dimension (e.g., around and along a cylinder axis, respectively), rather than simply around the axis) and/or a toroidal flow provided herein is a helical or distorted toroidal flow (e.g., having an axial and a lateral flow direction (both around and along a cylinder axis, respectively), rather than simply around the axis). In some embodiments herein, a toroidal vortex provided herein is a distorted toroidal vortex and/or a toroidal vortex flow is a helical or distorted toroidal vortex flow.

As illustrated in FIG. 12, additional inlets are optionally included in a reactor provided herein. In certain instances, a continuous or semi-continuous reactor provided herein comprises at least one additional inlet for injecting one or more reagent into the reactor. As illustrated in the reactor 200, in certain embodiments, the reactor 200 comprises, in some embodiments, a second inlet 215 facilitating the injection of a desired agent 216 into the reactor chamber 201. As exemplarily illustrated, the second inlet 215 is downstream from the first inlet 205. In some instances, a reactor 200 provided herein comprises a (optional) third inlet 217, such as for injecting a desired agent 218 into the reactor chamber 201. Additional inlets can also be provided, as desired. For example, the reactor 200 of FIG. 12 illustrates in additional inlet 219 that is near the first inlet 205, the additional inlet 219 being configured for injecting any suitable or desired agent 220 into the reactor chamber 201.

In certain embodiments, a reactor provided herein has a (e.g., fluid) flow (e.g., within the chamber thereof) from an input to an output (e.g., at different axial positions of the reactor). In other words, one or more fluid stock (e.g., solutions, suspensions, or combinations thereof) is input into the reactor via one or more inlet, such one or more fluid stocks shearing, mixing and flowing toward and out of one or more outlet, at least one outlet being down-flow ("downstream") from the one or more inlet. In various embodiments, any suitable flow is provided within the reactor (e.g., chamber thereof), such as a toroidal flow, a vortex flow (e.g., a Taylor vortex flow), a non-vortex flow, a shearing flow, a laminar flow (e.g., a Couette flow), a turbulent flow, and/or the like. In some embodiments, the fluid has a toroidal flow. In certain embodiments, the fluid has a non-vortex flow, such as a toroidal non-vortex flow. In some embodiments, a reactor provided herein is configured to provide a non-vortex flow, e.g., non-toroidal vortex flow, within a reactor chamber thereof. In certain embodiments, the flow is a modified Couette flow (e.g., a (non-vortex) Taylor-Couette with axial flow) and/or the reactor is a continuous Taylor-Couette reactor. In specific embodiments, the flow dynamics are configured by adjustment of flow rate, drum size, bore size, gap between the inner wall and the outer wall, rotation speed, or any combination thereof. FIG. 12 illustrates a Taylor vortex flow, however, depending on the rotation speed, rotating body, rotation direction, etc., other flow types can be observed in the reactor.

Figure 9:
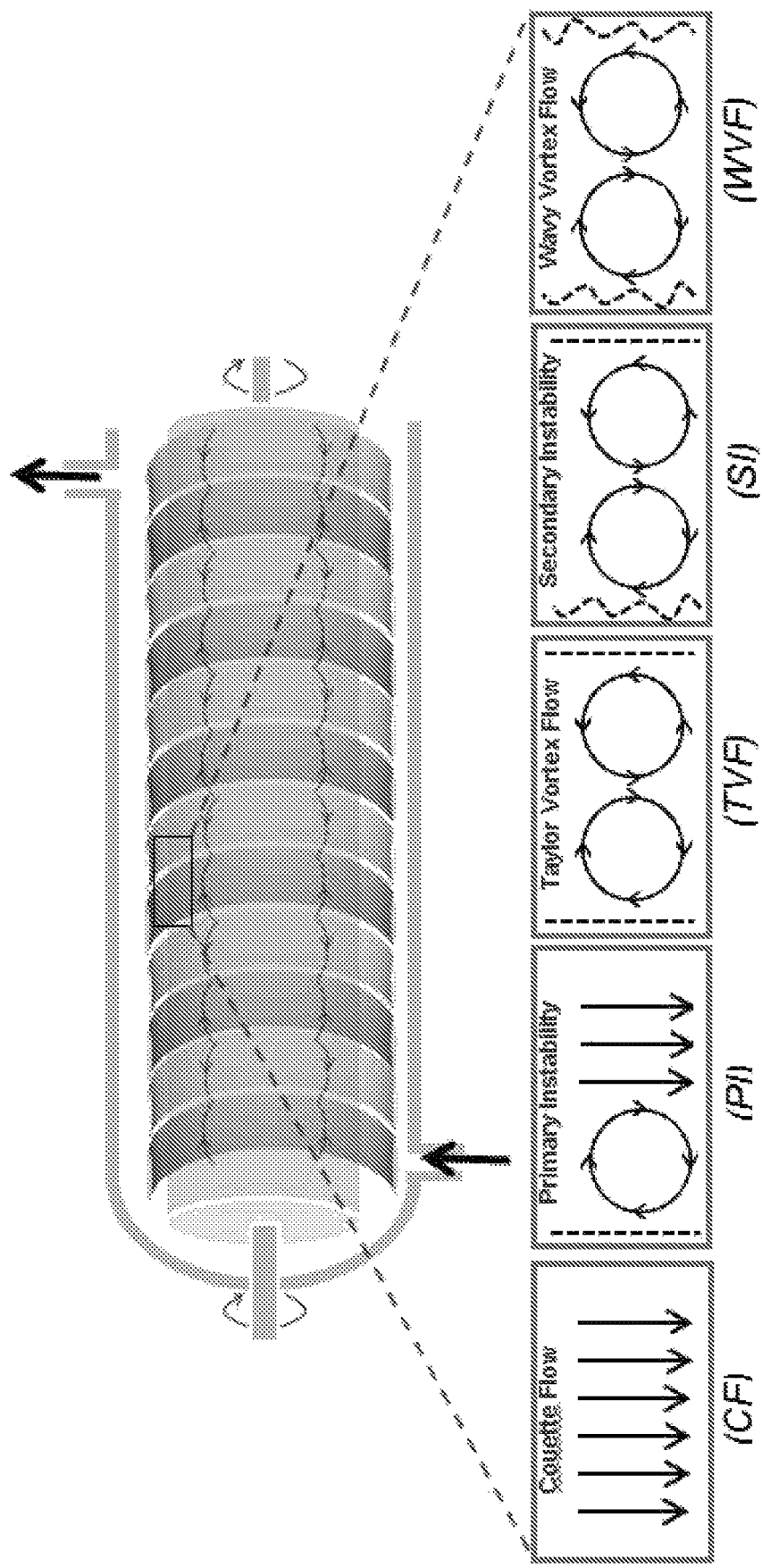
FIG. 9 illustrates various exemplary flow types of a process or reactor provided herein

FIG. 9 illustrates the Couette (laminar) flow observed at slow (inner) rotational speeds (e.g., wherein $Ta < Ta_c$). Further, as illustrated in FIG. 9, when Ta exceeds Tac, vortexes form, but when Ta is close to Tac, instabilities (vortexes) form near the reactor inlet, but as the flow continues toward the reactor exit, laminar flow resumes. This type of flow is illustrated as primary instabilities (PI). As Ta increases, instabilities form throughout the reactor, forming a Taylor vortex flow (TVF). Increasing the $Ta/Ta_c$ further, however, creates a secondary instability (SI), where a wavy flow is observed near the inlet of the reactor. Further increase of $Ta/Ta_c$ leads to a full wavy vortex flow (WVF). In some embodiments, the flow is a stable laminar (e.g., Couette) flow and/or a flow having a $Ta/Ta_c$ of less than 1, such as less than 0.9, such as less than 0.8 (e.g., 0.5 to 0.9 or 0.6 to 0.8). In certain embodiments, the flow is a stable vortex (e.g., Taylor) flow and/or a flow having a $Ta/Ta_c$ of about 1.05 to about 1.4, such as about 1.05 to about 1.3, such as about 1.1 to about 1.2.

In certain embodiments, a process or reactor provides a high shear (e.g., to graphite, such as injected or utilized therein). Shear rate is determined by any suitable process, such as $\gamma = v/h$, wherein $\gamma$ is shear rate measured in reciprocal seconds, v is velocity of a moving plate (e.g., relative to a stationary plate, such as described herein), and h is the distance between parallel plates. In some instances variations are contemplated to account for the cylindrical shapes contemplated herein. In some embodiments, high shear rates are provided by the flows described herein, such as at least $10^3$ s$^{-1}$, at least $5 \times 10^3$ s$^{-1}$, at least $10^3$ s$^{-1}$, or the like. As such, a small gap corresponds, in some instances, with high shear. Moreover, at larger diameters, higher cylinder/bore surface velocities are achieved at lower rotation rates. In certain embodiments, a reactor provided herein has a gap between the inner surface of the outer body and the outer surface of the inner body ("gap") that is relative to the inner surface of the bore ("$r_o$"). In some embodiments, gap/$r_o$ is about 0.01 to about 0.2, such as about 0.03 to about 0.1.

Figure 10:
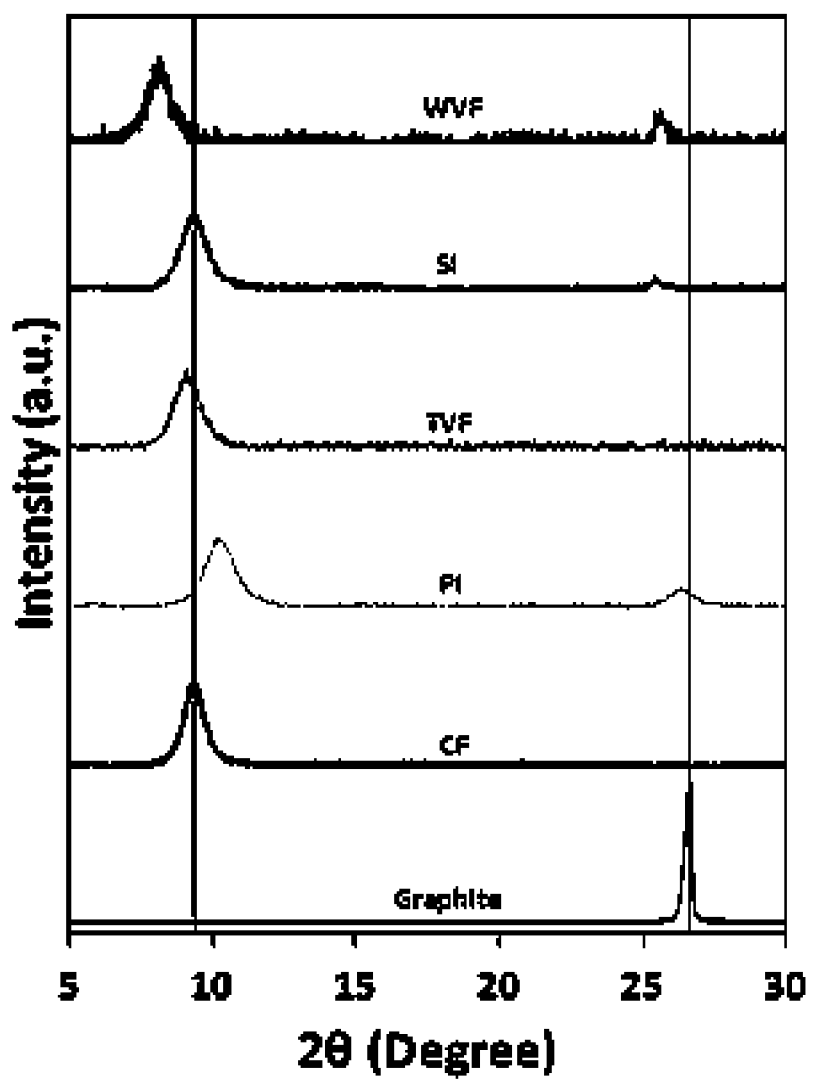
FIG. 10 illustrates XRD images of the resulting material prepared according to a process provided herein using various flow types.

FIG. 10 illustrates the results of injecting graphite into a reactor herein, with the various flow types illustrated in FIG. 9. As illustrated in FIG. 10, after just one minute, in a reactor having a (stable) laminar or Couette (shearing) flow is observed to have excellent conversion of graphite to graphenic compound (graphene oxide). By contrast the primary instability flow is observed to have good conversion to the graphenic compound, but some graphite remains. The stable vortex flow (Taylor vortex flow) is observed to provide excellent conversion of graphite to the graphenic compound, with no graphite component observed. By contrast, both flows having wavy morphologies and that use the most amount of energy produced good conversion of graphite to graphenic compound (graphene oxide), but had significant amounts of graphite also observed.

Figure 2:
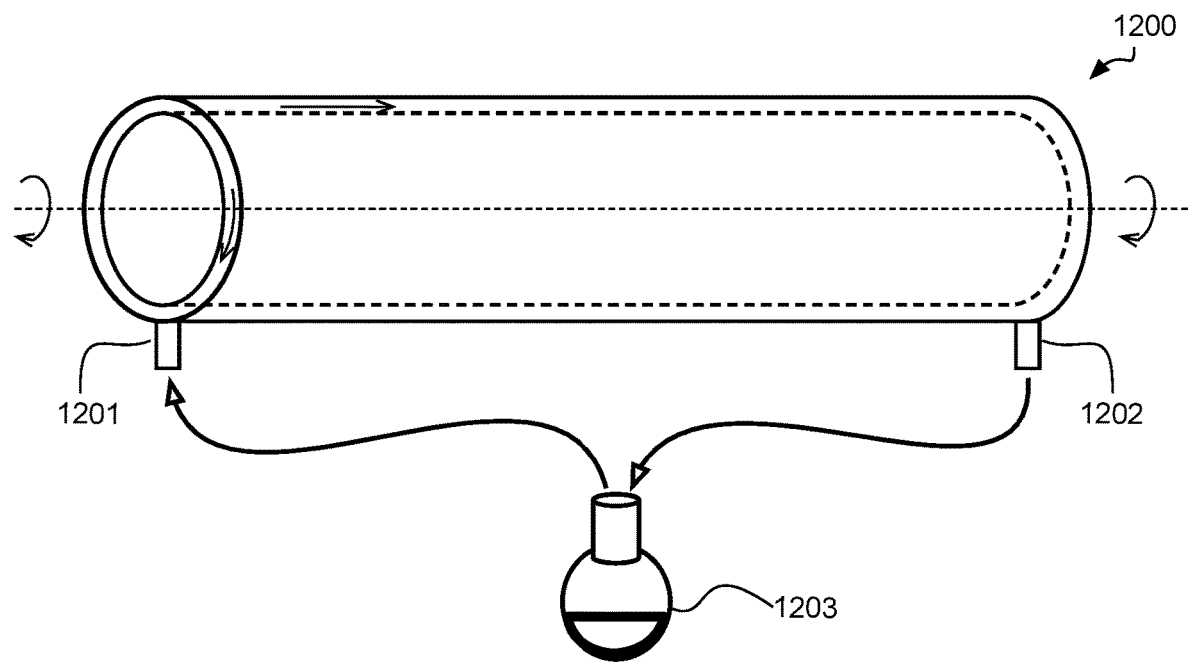
FIG. 2 illustrates a schematic of an exemplary semi-continuous toroidal flow reactor provided herein, with an inlet (additional inlets are optional) and an outlet.
Figure 14:
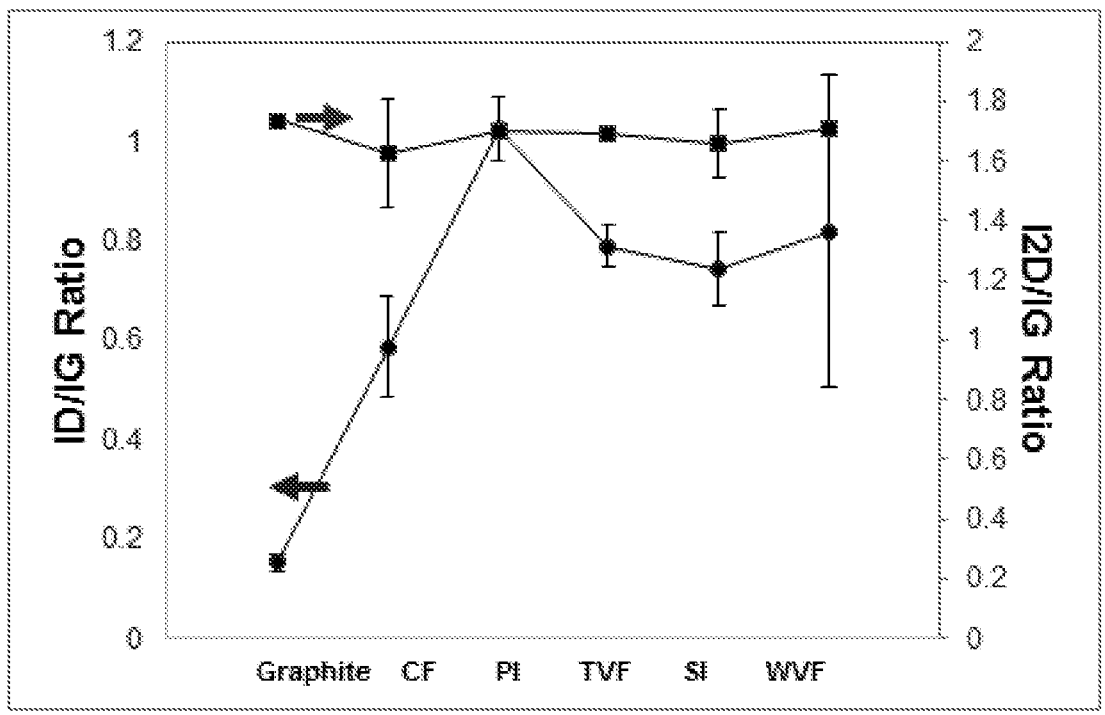
FIG. 14 illustrates Raman spectra G, D, and 2D peak results of various exemplary graphenic structures provided herein.

In various embodiments, a process provided herein utilizes or a system herein comprises any suitable reactor, such as a toroidal reactor. In some embodiments, the toroidal reactor is a toroidal flow reactor, a toroidal batch reactor, or the like. In various embodiments, the toroidal flow reactor is a toroidal continuous flow reactor, or a toroidal semi-continuous (semi-batch) reactor. FIG. 2 illustrates an exemplary toroidal semi-continuous (semi-batch) reactor provided herein. As illustrated, the reactor 1200 has at least one inlet 1201 and at least one outlet. In some instances, the reactor is charged via an opening or via the inlet 1201, such as with graphite and other reaction or suspending agents (e.g., surfactant and/or thickening agents and/or stabilizer), such as described herein. After being subjected to the reactor, a reaction mixture is expelled from the outlet 1202 and recycled back into the inlet 1202 (or a different inlet (not shown)). The outlet 1202 optionally feeds directly back into the inlet 1201, or proceeds through a collection container 1203. After a desired time or number of passes through the reactor 1200, the (e.g., final) graphenic product is expelled via an outlet 1202 and collected, such as in a collection receptacle 1203. The reactants are optionally subjected to the reactor any suitable number of times (passes through the reactor), such as one or more times, two or more times, 5 or more times, 10 or more times, or the like. FIG. 14 illustrates an exemplary toroidal continuous flow reactor, wherein a stock 1403 is provided to an inlet 1401 of a reactor provided herein, and the reaction product 1404 is collected via an outlet 1402 of the reactor 1400 after a single pass through the reactor.

Figure 8:
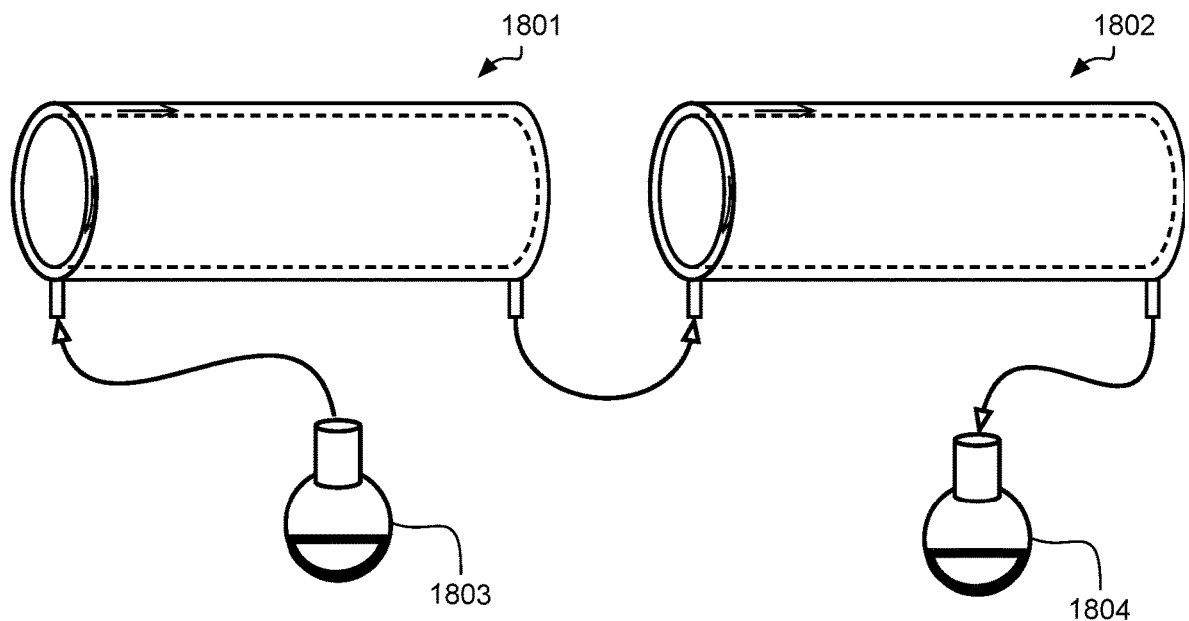
FIG. 8 illustrates an exemplary system provided herein comprising a plurality of exemplary reactors provided herein.
Figure 18:
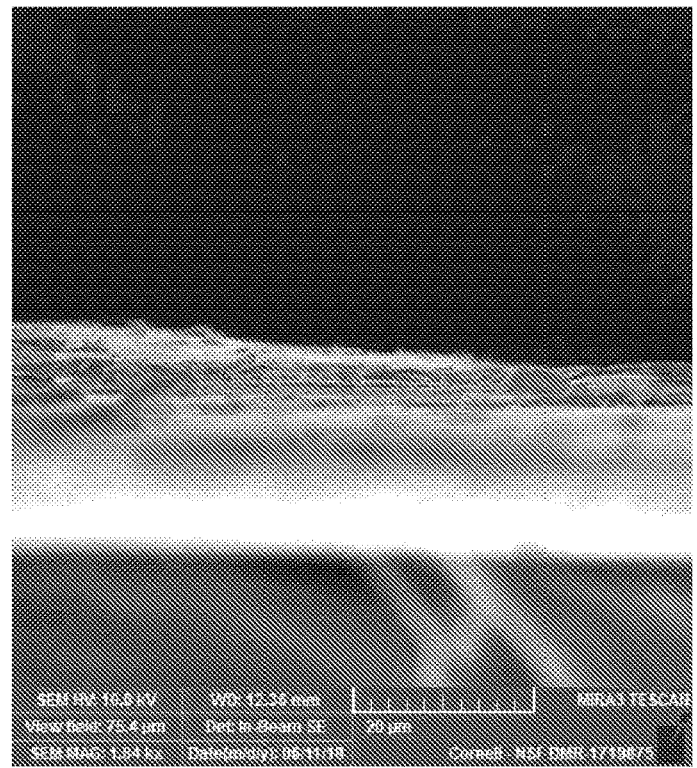
FIG. 18 illustrates a cross-sectional SEM image of a layer of exemplary graphenic structures provided herein.

In some embodiments, a system herein comprises (or a process provided herein comprises using) a series of reactors, such as illustrated in FIG. 8. FIG. 8 illustrates an exemplary system comprising a plurality of reactors (e.g., a first reactor 1801 and a second reactor 1802) provided herein, such as wherein a stock is provided to an inlet of a first reactor 1801, a first product is provided via an outlet of the first reactor 1801, the first product is provided to an inlet of a second reactor 1802 and a second product is provided via an outlet of a second reactor 1802. In some instances, the first product is optionally treated prior to providing to the second reactor. For example, in some instances, graphenic product (e.g., graphene) is separated or extracted from the first product before subjecting the remainder of the first product to the second reactor. FIG. 18 illustrates an exemplary continuous flow reactor, but semi-batch or semi-continuous reactors of such configurations are also provided herein.

In certain embodiments, the reactor comprises one or more temperature controlled domains. In certain embodiments, a jacket or coil is positioned in at least partial surrounding relation to the outer wall of the reactor. In some instances, the temperature control domain is a cooling domain (e.g., wherein the jacket or coil comprises a coolant). In certain embodiments, a system provided herein has a first temperature controlled domain comprising a cooling domain and a second temperature controlled domain comprising a heating domain. In some instances, a first and a second reactor are provided in a system herein, such as illustrated in FIG. 8, wherein the first reactor is cooled and the second reactor is heated.

Figure 1:
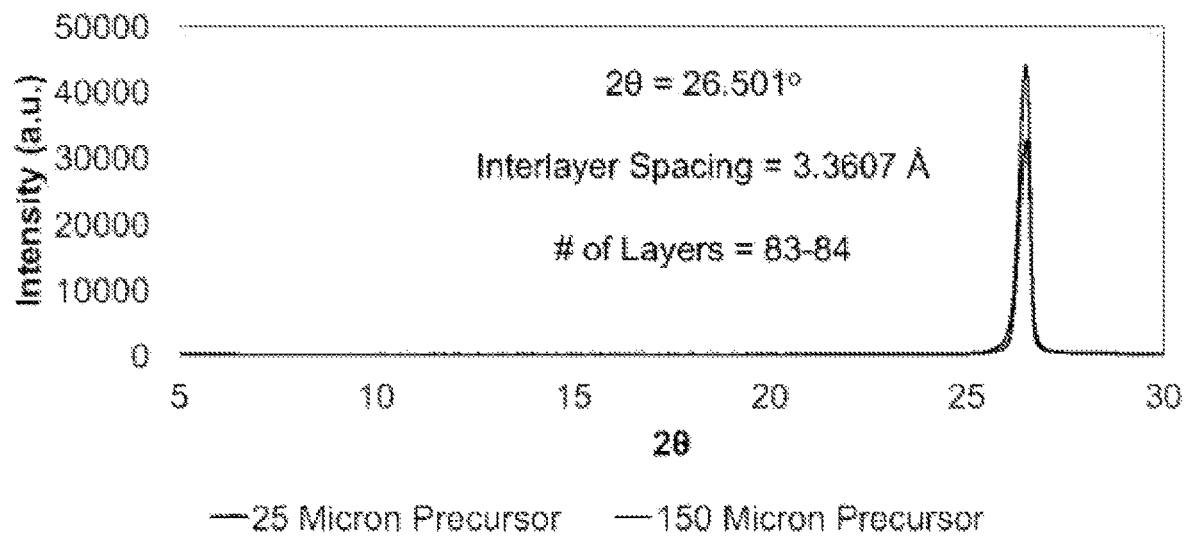
FIG. 1 illustrates XRD traces of exemplary graphite materials utilized in processes and compositions herein.

In certain embodiments, graphite utilized herein is any suitable graphite, such as natural graphite, natural graphite flake, synthetic graphite, any combination thereof, or the like. In certain embodiments, the graphite is a multi-layered structure comprising any suitable number of layers and/or having any suitable (e.g., particle) dimension or size. In certain instances, a graphite provided herein comprises at least 25 layers (e.g., graphitic carbon layers stacked on top of one another), at least 50 layers, at least 75 layers, or the like. FIG. 1 illustrates XRD patterns of exemplary graphite materials utilized in processes and compositions herein. Various graphitic particle sizes are optionally utilized, such as having an average size of at least 1 micron (micrometer or μm), at least 5 micron, at least 10 micron, at least 25 micron, at least 100 micron, or the like. In specific instances, the average particle size is less than 1 mm, less than 500 micron, less than 250 micron, less than 100 micron, or the like. Any suitable concentration of graphite is utilized in a stock and/or reactor herein. In specific embodiments, the concentration of graphite in a stock described herein is about 0.1 wt. % to about 50 wt. %, e.g., 0.5 wt. % to 50 wt. %.

In some embodiments, any suitable strong acid, oxidizing agent and/or intercalating agent provided is utilized herein. In some embodiments, the strong acid, oxidizing agent and/or intercalating agent functions to swell and/or intercalate into and/or oxidize the graphite layers. In some embodiments, the strong acid, oxidizing agent and/or intercalating agent comprises one or more of the following: sulfuric acid, bisulfate, sulfate, nitric acid, nitrate, perchloric acid, perchlorate, permanganate, phosphoric acid, phosphate, biphosphate, or the like. In the case of bisulfate, sulfate, nitrate, perchlorate, permanganate, phosphate, biphosphate, or other anion utilized, any suitable cation is optionally utilized, such as sodium, potassium, or the like. It is to be understood that in a stock, however, reference to an ion or salt herein includes reference to the compound in ionic (e.g., solvated or disassociated) or salt form. Concentrations of strong acids or intercalating agents utilized herein are present in any suitable amount.

In certain embodiments, a process herein includes subjecting a reaction mixture to a quenching agent or an additional oxidizing agent. Any suitable quenching or oxidizing agent is utilized in any method or system or composition described herein. In specific embodiments, the quenching or oxidizing agent is a peroxide, such as hydrogen peroxide (e.g., 1-50 wt. %, such as 3 wt. %, 30 wt. %, or the like hydrogen peroxide). In certain embodiments, the oxidization of the graphite (e.g., to form graphite oxide) is achieved using the strong acid and/or intercalating agent, without the need for exposure to an additional oxidizing agent or stock. In some instances, the additional agent is a quenching agent, such as to quench residual oxidizing and/or intercalating agents, strong acids, and/or the like.

Figure 6:
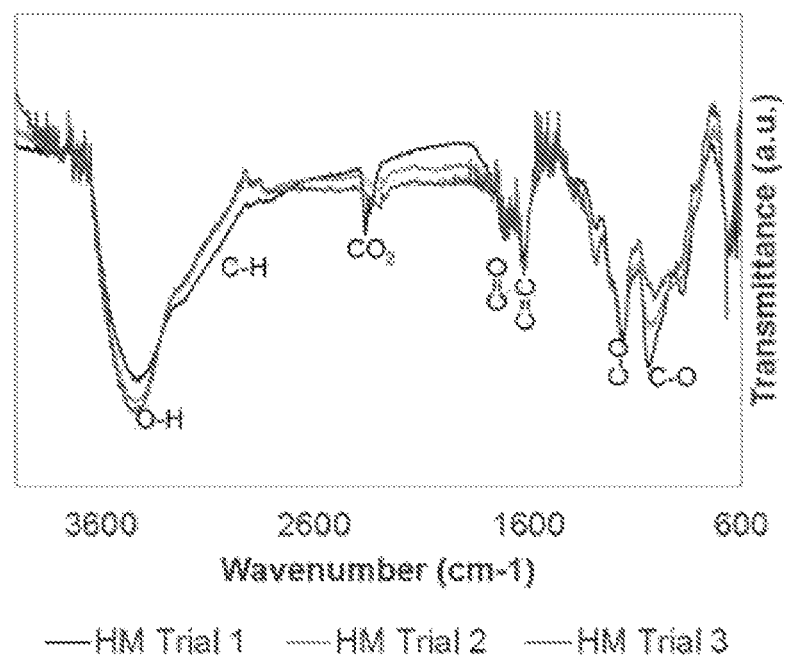
FIG. 6 illustrates traces of FTIR patterns of an exemplary graphene oxide materials obtained from a batch reactor using identical reagents and reaction conditions.
Figure 7:
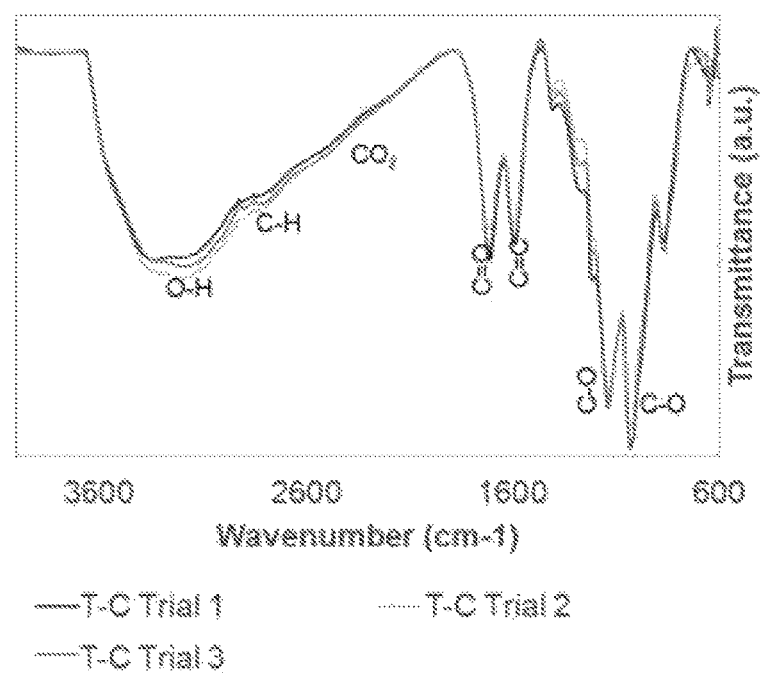
FIG. 7 illustrates traces of FTIR patterns of an exemplary graphene oxide materials obtained from a toroidal reactor using identical reagents and reaction conditions.

As illustrated by the FTIR patterns in FIG. 6, even using the same oxidizing agents/intercalating agents can produce significant batch-to-batch variations in the graphenic products produced converting graphite to graphenic products. By contrast, in various instances herein, reactors (batch and flow) produce very consistent graphenic materials batch-to-batch (including, in the case of flow reactors, on a run-to-run basis or a first out, last out basis). As illustrated in the FTIR patterns of FIG. 7, processes and reactors provided herein are suitable for producing highly consistent materials on a batch-to-batch basis. Moreover, by controlling, where, when and what reagents are added to the reaction, with a high degree of precision, reactors provided herein prove a highly tunable platform for produce graphenic materials.

Figure 16:
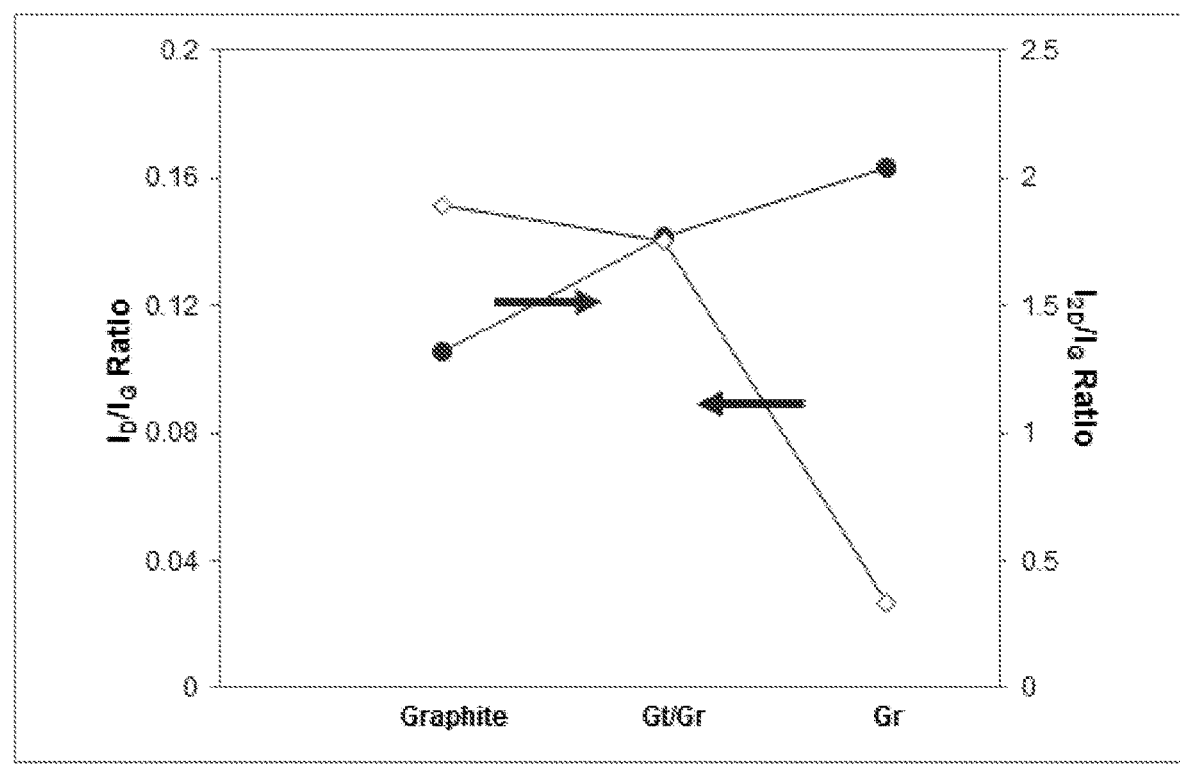
FIG. 16 illustrates Raman spectra G, D, and 2D peak results of various exemplary graphenic structures provided herein.
Figure 17:
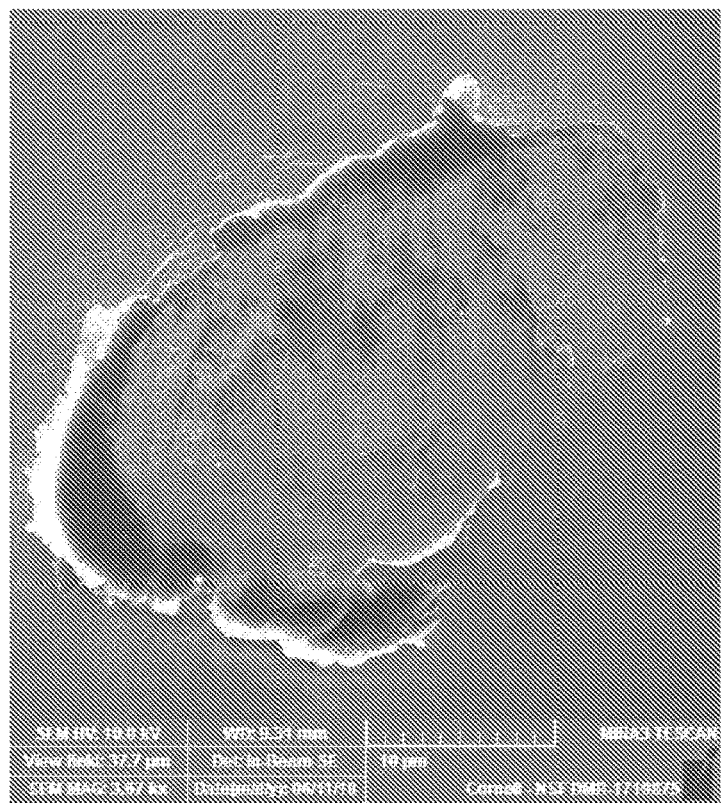
FIG. 17 illustrates an SEM image of an exemplary graphenic structure provided herein.

FIG. 16 further illustrates the uniformity of the graphenic compounds produced according to the processes herein, particularly when using stable toroidal flows. As illustrated, the TV and SI flows produce graphenic materials with the greatest oxidation levels, whereas the wavy vortex flow produces the least oxidation, despite using the most energy. Moreover, the peak variation of the TV flow is extremely small (small error bars) compared that that of the other flows, including the SI flow, which also had high oxidation. FIG. 17 illustrates ID/IG and I2D/IG ratios, with the TVF demonstrating the smallest error bars, indicating the greatest uniformity of the graphenic compounds produced thereby.

Figure 20:
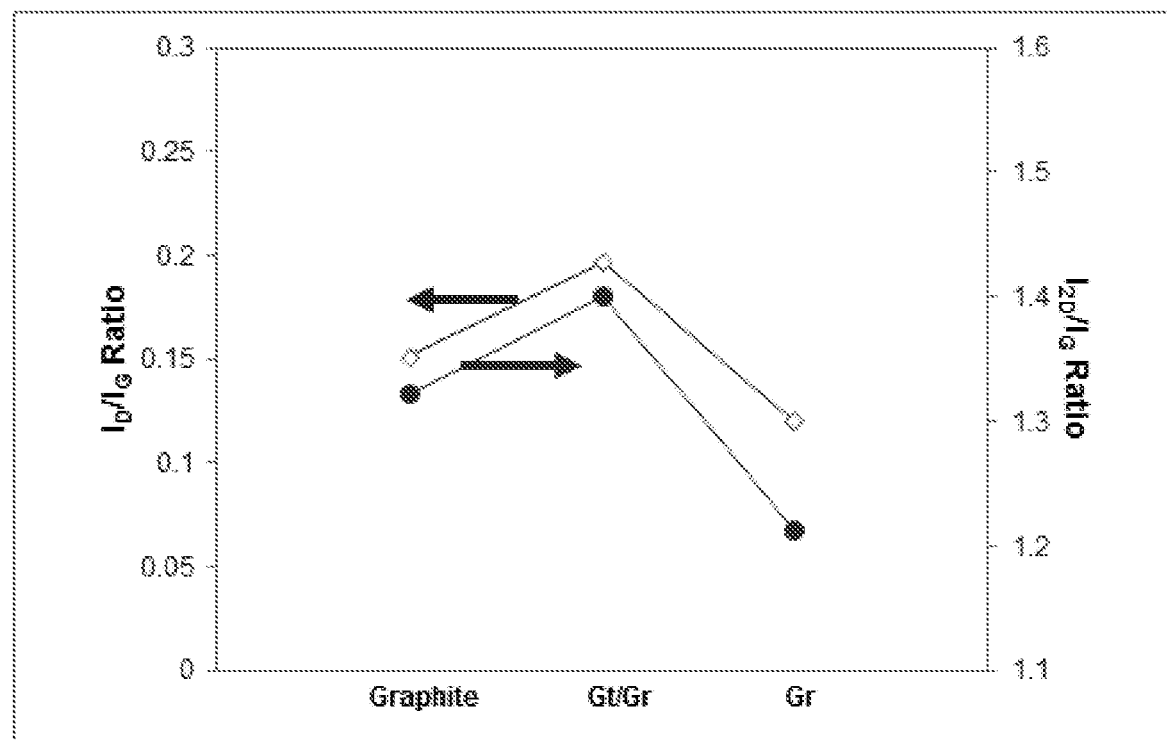
FIG. 20 illustrates Raman spectra G, D, and 2D peak results of various exemplary graphenic structures provided herein.

In some instances, increasing wavenumber of G band (about 1587 cm-1) corresponds with number of graphenic layers or sheets in a graphenic compound (e.g., with increasing intensity corresponding with increasing layers). In certain instances, increasing intensity of D band (about 1350 cm-1) corresponds with increasing graphitic/graphenic defect. In some instances, the 2D band (about 2700 cm-1) corresponds with stacking and decreases with increasing exfoliation. In certain instances, with decreasing intensity (area) of the D band relative to the G band ($I_D/I_G$) the number of layers are reduced (e.g., with single layered graphene having an $I_D/I_G$ of about 0) and with increasing $I_{2D}/I_G$ ratios the number of layers are reduced (e.g., with single layered graphene having an $I_{2D}/I_G$ ratio of about 2). As illustrated in FIG. 16 and FIG. 20, various graphenes are produced by various exemplary iterations provided herein. In some embodiments, provided herein is a graphene compound (e.g., graphene) or composition having (e.g., average) ID/IG of less than 0.2, such as less than 1.5, less than 1, less than 0.05, or the like. In certain embodiments, provided herein is a graphene compound (e.g., graphene) or composition having (e.g., average) I2D/IG of at least 1.1, such as at least 1.5, at least 1.7, at least 1.8, at least 1.9, or about 2. In exemplary embodiments, ID/IG is less than 0.1 and I2D/IG is at least 1.9. In other exemplary embodiments, the ID/IG and/or I2D/IG ratios are about those illustrated in FIG. 16 or FIG. 20.

Figure 11:
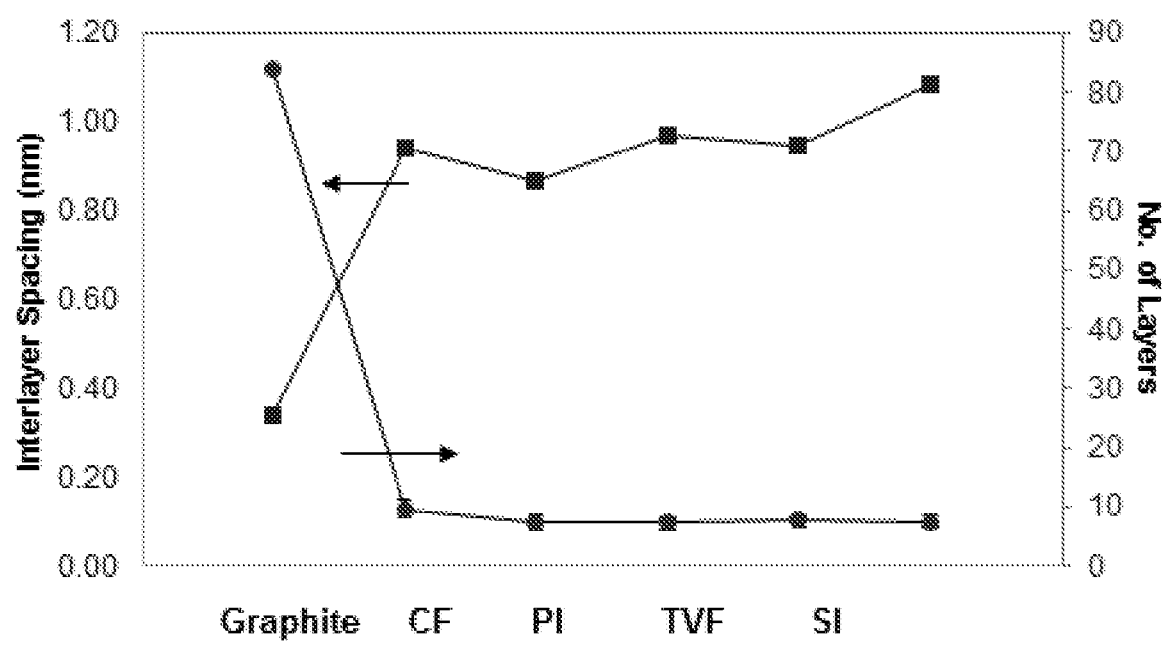
FIG. 11 illustrates interlayer spacing and multi-layered characteristics of exemplary graphenic materials prepared according to exemplary processes provided herein.

FIG. 11 illustrates the different interlayer spacing of the graphenic compounds prepared using the various types of flows described herein. As illustrated, Graphite has very low interlayer spacing, whereas all of the graphenic materials prepared according to a process described herein, using the various flow types described herein, produce graphenic compounds having an interlayer spacing of about 0.8 nm (nanometer) to about 1.1 nm (compared to less than 0.4 nm for graphite). Moreover, the graphenic compounds are observed to have fewer than 10 layers (e.g., 5 to about 10, such as about 8), as compared to about 84 (on average) for the graphite.

In certain embodiments, graphenic compounds described herein and/or produced according to a process herein have 1 to about 15 layers (e.g., on average), such as 1 to about 10 (e.g., on average), such as about 2 to about 10 layers (e.g., on average) or about 5 to about 10 layers (e.g., on average). In some embodiments, (multilayered) graphenic compounds described herein and/or produced according to a process described herein have an average interlayer spacing of about 0.8 nm to about 1.2 nm, such as about 0.8 nm to about 1 nm.

In certain embodiments, provided herein are graphenic compounds having large sizes. In some embodiments, graphenic compounds have a lateral dimension that is comparable to the size of a graphite (e.g., at least 50% the lateral dimension of the graphite, at least 60% the size of the graphite, at least 70% the size of the graphite, at least 80% the size of the graphite, or the like) from which it was produced. In certain embodiments, a graphenic compound provided herein and/or produced according to a process provided herein has a lateral dimension (e.g., longest or average lateral dimension) of at least 20 micron, such as 20 micron to about 200 micron. In some embodiments, the lateral dimension (e.g., longest or average lateral dimension) is at least 25 micron, such as 25 micron to about 200 micron. In certain embodiments, the later dimension (e.g., longest or average lateral dimension) is at least 30 micron, such as 30 micron to about 200 micron. In specific embodiments, the later dimension (e.g., longest or average lateral dimension) is at least 40 micron, such as 40 micron to about 200 micron.

EXAMPLES

Example 1—Graphene Oxide: Semi-Continuous Toroidal (Helical) Reactor

Figure 4:
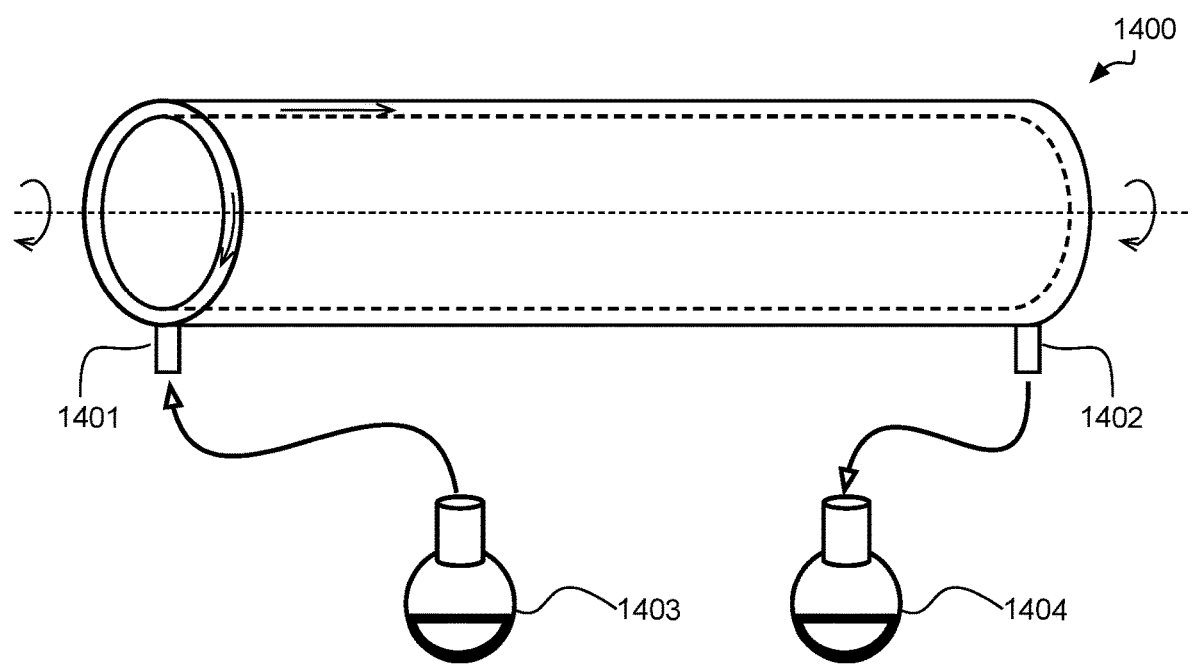
FIG. 4 illustrates a schematic of an exemplary continuous toroidal flow reactor provided herein, with an inlet (additional inlets are optional) and an outlet.

Graphite is obtained from a variety of sources, including a graphite labelled as 25 micron and a graphite labelled as 150 micron. FIG. 4 illustrates a powder X-ray diffraction (XRD) pattern for the two graphite materials. As illustrated in FIG. 4, 2-theta (2θ) values for the two materials are similar, with a value of about 26.5°. Interlayer spacing is calculated to be about 3.36 Å, with the materials having about 80-85 total layers.

Graphite (1 g, 25 micron) is dispersed in a mixture of 98% sulfuric acid (110 mL) and 85% phosphoric acid (25 mL) at room temperature using a mechanical stirrer. After 10 min of stirring, 4 wt equiv of $KMnO_4$ (4 g) is added to a semi-continuous/semi-batch toroidal reactor (e.g., wherein components are added to the reactor chamber and sealed, without the use of the inlets and outlets described herein), such as illustrated in FIG. 2, is utilized to manufacture graphene oxide from graphite. The internal drum is rotated at a rate of about 600 revolutions per minute (rpm). The flow is controlled by a pump, which is operated at a rate of 50 rpm.

After cycling for 30 minutes, the product is quenched with a 30% hydrogen peroxide solution. The resultant graphene oxide product is evaluated with two materials being observed, with the first material (identified by a first XRD peak) has a powder XRD two-theta (2θ) value of about 8.49° and has a calculated interlayer spacing of about 10.40 Å. The graphene oxide thus provided is determined to comprise about 4 layers, on average. The second material (identified by a second XRD peak) has a powder XRD two-theta (2θ) value of about 26.3° and has a calculated interlayer spacing of about 3.38 Å. This peak corresponds with graphene oxide having about 17 layers, on average.

Relative to the graphene oxide prepared by a similarly run batch process, the graphene oxide materials in this semi-continuous example are much more highly processed after identical periods of time (30 minutes). In the batch process, the larger (graphene oxide) peak after 30 minutes has an interlayer spacing layer of 9.01 Å, versus the interlayer spacing of about 10.40 Å observed for the semi-continuous process. Moreover, the batch toroidal reactor process primarily produces graphene oxide having about 7 layers after 30 minutes, whereas the semi-continuous process primarily produces graphene oxide having about 4 layers after 30 minutes.

In addition, while the batch toroidal reactor process produces a mix of graphene oxide and graphite after 30 minutes, the semi-continuous process produces only graphene oxide. Where the secondary product of the batch process after 30 minutes is graphite, the secondary product of the semi-continuous process after 30 minutes is multi-layered graphene oxide. However, rather than the 4 layered graphene oxide of the primary product of the semi-continuous process, the secondary product of the semi-continuous process has 17 layers, on average.

Therefore, use of the semi-continuous process produces graphene oxide with increased exfoliation and increased interlayer spacing relative to an otherwise similar batch process. Moreover, both processes produce graphene oxide at a much faster rate than a non-toroidal batch process, which takes several hours to convert graphite to graphene oxide in a suitable amount.

Example 2—Graphene Oxide: Continuous Toroidal (Helical) Reactor

Using a process similar to described in Example 1, a continuous toroidal reactor (e.g., wherein components are added to the reactor chamber and sealed, with inlets providing raw materials and a graphene oxide product), such as illustrated in FIG. 4 is utilized to manufacture graphene oxide from graphite. The internal drum is rotated at a rate of about 600 revolutions per minute (rpm) and the flow is controlled by a pump, which is operated at a rate of 50 rpm.

The graphite raw material is injected into the reactor and passed through the reactor in 10 minutes, whereupon the product is collected and quenched with a 30% hydrogen peroxide solution. The resultant graphene oxide product (identified by a first XRD peak) has a powder XRD two-theta (2θ) value of about 7.39° and has a calculated interlayer spacing of about 11.95 Å. The graphene oxide thus provided is determined to comprise about 6 layers, on average.

Relative to the graphene oxide prepared by the batch process of Example 1 after 30 minutes, the graphene oxide materials in this continuous example are much more highly processed after just ⅓ of the time (10 minutes). In the batch process, a mixture of graphene oxide and a graphite is produced after 30 minutes, whereas the continuous process produces just graphene oxide after just 10 minutes. Moreover, the graphene oxide process of the batch process of Example 1 produces graphene oxide having an interlayer spacing layer of 9.01 Å after 30 minutes, versus the interlayer spacing of about 11.95 Å observed for the continuous process after just 10 minutes. Moreover, the batch toroidal reactor process primarily produces graphene oxide having about 7 layers after 30 minutes, whereas the continuous process primarily produces graphene oxide having about 6 layers after 10 minutes.

In addition, while the batch reactor process of Example 1 produces a mix of graphene oxide and graphite after 30 minutes, the continuous process of Example 2 produces only graphene oxide, even after a much shorter time period (10 minutes). Where the secondary product of the batch process of Example 1 after 30 minutes is graphite.

Relative to the mixed graphene oxide prepared by the semi-continuous process of Example 1 after 30 minutes, the graphene oxide materials in this continuous example are much more highly processed after just ⅓ of the time (10 minutes). In the semi-continuous process, a (e.g., bimodal) mixture of graphene oxides is produced after 30 minutes, whereas the continuous process produces a largely uniform graphene oxide after just 10 minutes. Moreover, the graphene oxide process of the semi-continuous process of Example 1 produces graphene oxide having an interlayer spacing layer of 10.40 Å after 30 minutes, versus the interlayer spacing of about 11.95 Å observed for the continuous process after just 10 minutes. However, the semi-continuous toroidal reactor process primarily produces graphene oxide having about 4 layers (with a secondary product having about 17 layers) after 30 minutes, whereas the continuous process primarily produces graphene oxide having about 6 layers after 10 minutes.

Therefore, use of the continuous process of Example 4 produces graphene oxide with increased exfoliation and increased interlayer spacing relative to the batch process of Example 2. Moreover, both processes produce graphene oxide at a much faster rate than the general batch process of Example 1, which takes several hours to convert graphite to graphene oxide in a suitable amount.

Example 3—Graphene Oxide: Continuous Toroidal (Helical) Reactor (1 Minute)

Using a process similar to described in Example 2, a continuous toroidal reactor (e.g., wherein components are added to the reactor chamber and sealed, with inlets providing raw materials and a graphene oxide product), such as illustrated in FIG. 4 is utilized to manufacture graphene oxide from graphite. The graphite raw material is injected into the reactor and passed through the reactor in just 1 minute, whereupon the product is collected and quenched with a 30% hydrogen peroxide solution. Similar to that observed in Example 4, the resultant graphene oxide product has a calculated interlayer spacing of about 12 Å and 6 layers, on average. Moreover, very large graphenic structures are obtained, generally over 20 micron (such as about 50 micron).

Various products prepared according to processes similar to those in Examples 1-5 are illustrated in Table 1.

TABLE 1

| Reaction scheme | Reaction Time | Average No. of GO layers and layer spacing |
|---|---|---|
| Batch reactor (stirred tank) | 8 hrs | 5-11 layers, 11 Å |
| T-C reactor (batch) | 30 min. | 9 layers, 9 Å |
| Semi-batch T-C reactor | 30 min. | 4 layers, 10 Å |
| Continuous T-C reactor | 1 min. | 6 layers, 12 Å |

Example 4—Graphene Oxide Variation

A single graphite sample from a single source is divided into three portions and subjected to identical batch processing conditions. FTIR analysis of the resultant products are evaluated and illustrated in FIG. 6. As illustrated, significant variations in oxidation are observed, batch-to-batch.

Similarly, a single graphite sample from a single source is divided into three portions and subjected to an identical process using a toroidal reactor, such as described in Example 1. FTIR analysis of the resultant products are evaluated and illustrated in FIG. 7. As illustrated, very little variations in oxidation is observed, batch-to-batch, with very good overlap of FTIR traces being observed between samples.

Example 5—Flow Variation

Graphitic stock is provided to a reactor as described in the examples above is utilized. The flow type used in the reactor is varied by varying the rotational rates of the reactor walls. FIG. 9 illustrates the Couette (laminar) flow observed at slow rotational speeds (e.g., wherein $Ta<Ta_c$). Further, as illustrated in FIG. 9, when Ta exceeds Tac, vortexes form, but when Ta is close to Tac, instabilities (vortexes) form near the reactor inlet, but as the flow continues toward the reactor exit, laminar flow resumes. This type of flow is illustrated as primary instabilities (PI). As Ta increases, instabilities form throughout the reactor, forming a Taylor vortex flow (TVF). Increasing the $Ta/Ta_c$ further, however, creates a secondary instability (SI), where a wavy flow is observed near the inlet of the reactor. Further increase of $Ta/Ta_c$ leads to a full wavy vortex flow (WVF).

FIG. 10 illustrates the results of injecting graphite into a reactor herein, with the various flow types illustrated in FIG. 9. As illustrated in FIG. 10, after just one minute, in a reactor having a (stable) laminar or Couette (shearing) flow is observed to have excellent conversion of graphite to graphenic compound (graphene oxide). By contrast the primary instability flow is observed to have good conversion to the graphenic compound, but some graphite remains. The stable vortex flow (Taylor vortex flow) is observed to provide excellent conversion of graphite to the graphenic compound, with no graphite component observed. By contrast, both flows having wavy morphologies and that use the most amount of energy produced good conversion of graphite to graphenic compound (graphene oxide), but had significant amounts of graphite also observed.

FIG. 11 illustrates the different interlayer spacing of the graphenic compounds prepared using the various types of flows described herein. As illustrated, Graphite has very low interlayer spacing, whereas all of the graphenic materials prepared according to a process described herein, using the various flow types described herein, produce graphenic compounds having an interlayer spacing of about 0.8 nm to about 1.1 nm (compared to less than 0.4 nm for graphite).

Moreover, the graphenic compounds are observed to have fewer than 10 layers (e.g., 5 to about 10, such as about 8), as compared to about 84 (on average) for the graphite.

Figure 13:
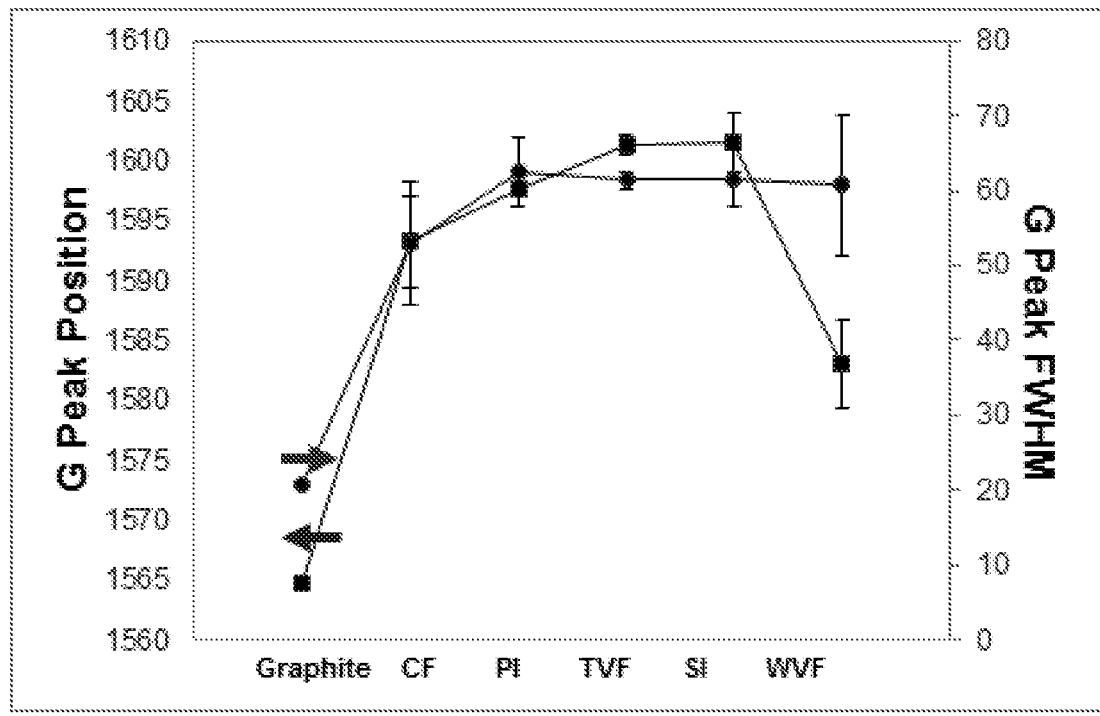
FIG. 13 illustrates Raman spectra G Peak results of various exemplary graphenic structures provided herein.

FIG. 13 illustrates the uniformity of the graphenic compounds produced according to the processes herein, particularly when using stable or Taylor vortex flows. As illustrated, the TV and SI flows produce graphenic materials with the greatest oxidation levels, whereas the wavy vortex flow produces the least oxidation, despite using the most energy. Moreover, the peak variation of the TV flow is extremely small (small error bars) compared that that of the other flows, including the SI flow, which also had high oxidation. FIG. 14 illustrates ID/IG and I2D/IG ratios, with the TVF demonstrating the smallest error bars, indicating the greatest uniformity of the graphenic compounds produced thereby.

Example 6—Graphene: Toroidal Reactor

A reactor similar to that described in Example 1 is provided (inner and outer bodies being circular cylinders). A graphitic stock is prepared by dispersing graphite in an aqueous medium comprising Pluronic F127 (polyethyleneoxide-b-polypropyleneoxide-b-polyethylene oxide or PEOx-b-PPOy-b-PPOz, wherein x and z~100 and y~65) and xanthan gum. The stock is provided to an inlet of the reactor and subjected to the toroidal flow conditions. The inner reactor body is rotated at a speed of about 600 rpm, forming toroidal vortices in the reactor. Little to no graphene is observed upon collection.

The processes are repeated, except in this experiment, the rate of rotation of the inner body is reduced until a non-vortex, laminar (Couette) flow is observed. After one hour, a product is collected and allowed to rest for 1-2 days; after resting, a top and bottom phase form, with the top phase comprising graphene and the bottom phase comprising a mixture of graphite and graphene. Low conversion (less than 5-10%) of graphite to graphene is observed.

Example 7—Graphene: Toroidal Reactor—Outer Rotation

A reactor similar to that described in Example 6 is provided (inner and outer bodies being circular cylinders), with the outer body, rather than the inner body, configured to rotate. A graphitic stock is prepared by dispersing graphite in an aqueous medium comprising Pluronic F127 (polyethyleneoxide-b-polypropyleneoxide-b-polyethylene oxide or PEOx-b-PPOy-b-PPOz, wherein x and z~100 and y~65) and xanthan gum. The stock is provided to an inlet of the reactor and subjected to the toroidal flow conditions. The inner reactor body is rotated at a speed of about 1500 rpm, forming non-vortex, toroidal flow conditions in the reactor. After exfoliation, the product is collected and allowed to rest for 1-2 days; after resting, a top and bottom phase form, with the top phase comprising graphene and the bottom phase comprising a mixture of graphite and graphene. Good conversion (up to 50% or more) of graphite to graphene is observed.

Figure 15:
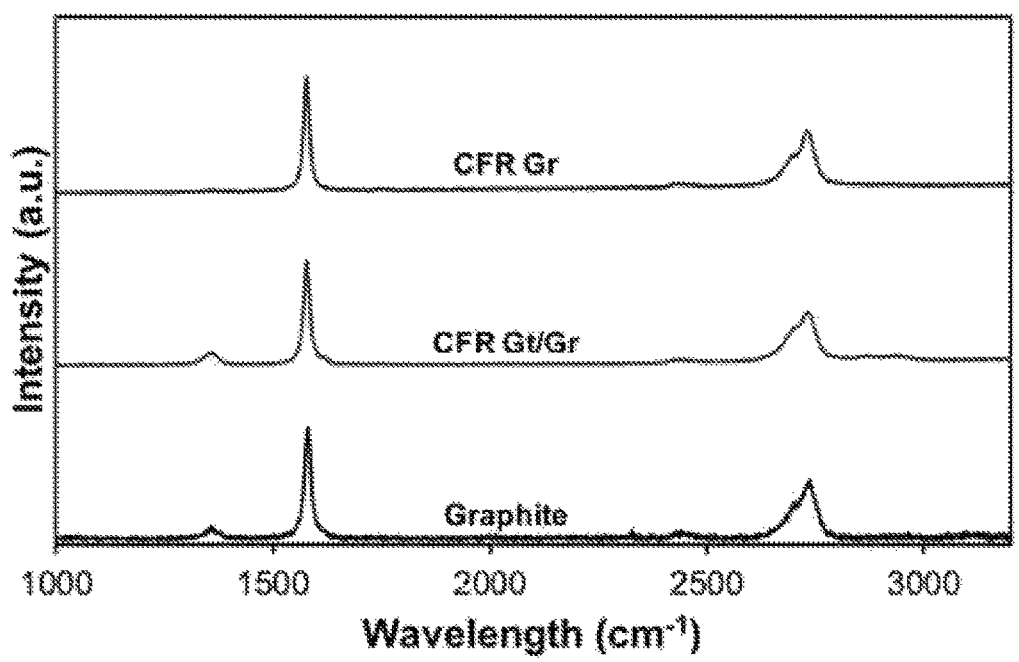
FIG. 15 illustrates Raman spectra of various exemplary graphenic structures provided herein.

FIG. 15 illustrates Rama spectrometry traces of the top phase (CFR Gr), the bottom phase (CFR Gt/Gr), and unreacted graphite. As can be observed the top phase has good conversion to low layered graphene (e.g., by the absence of the D band indicated by the box). FIG. 16 illustrates a plot of the $I_D/I_G$ and $I_{2D}/I_G$ ratios relative the top phase, the bottom phase and unreacted graphite. With decreasing $I_D/I_G$ ratios the number of layers are reduced (e.g., with single layered graphene having an $I_D/I_G$ of about 0) and with increasing $I_{2D}/I_G$ ratios the number of layers are reduced (e.g., with single layered graphene having an $I_{2D}/I_G$ ratio of about 2). As is illustrated, the top phase comprises mono- to few-layered graphene, whereas the bottom phase comprises a mixture of graphenes and graphite. The graphene of the top phase are electrosprayed and observed by scanning electron microscopy (SEM), as illustrated in FIG. 17. As is observed, very large low-defect/pristine graphene (>20 micron lateral dimension) is obtained. Moreover, as illustrated in FIG. 18, SEM cross-sections of the graphene demonstrates that mono- and few-layered graphene is obtained and stacked during deposition.

Example 8—Graphene: Toroidal Reactor—Oval Cylinder

A reactor similar to that described in Example 6 is, with the inner body being an elliptical cylinder, rather than a circular cylinder. A graphitic stock is prepared similar to the process of Example 6. The stock is provided to an inlet of the reactor and subjected to the toroidal flow conditions. The inner reactor body is rotated, forming non-vortex, toroidal flow conditions in the reactor. After exfoliation, the product is collected and allowed to rest for 1-2 days; after resting, a top and bottom phase form, with the top phase comprising graphene and the bottom phase comprising a mixture of graphite and graphene.

Figure 19:
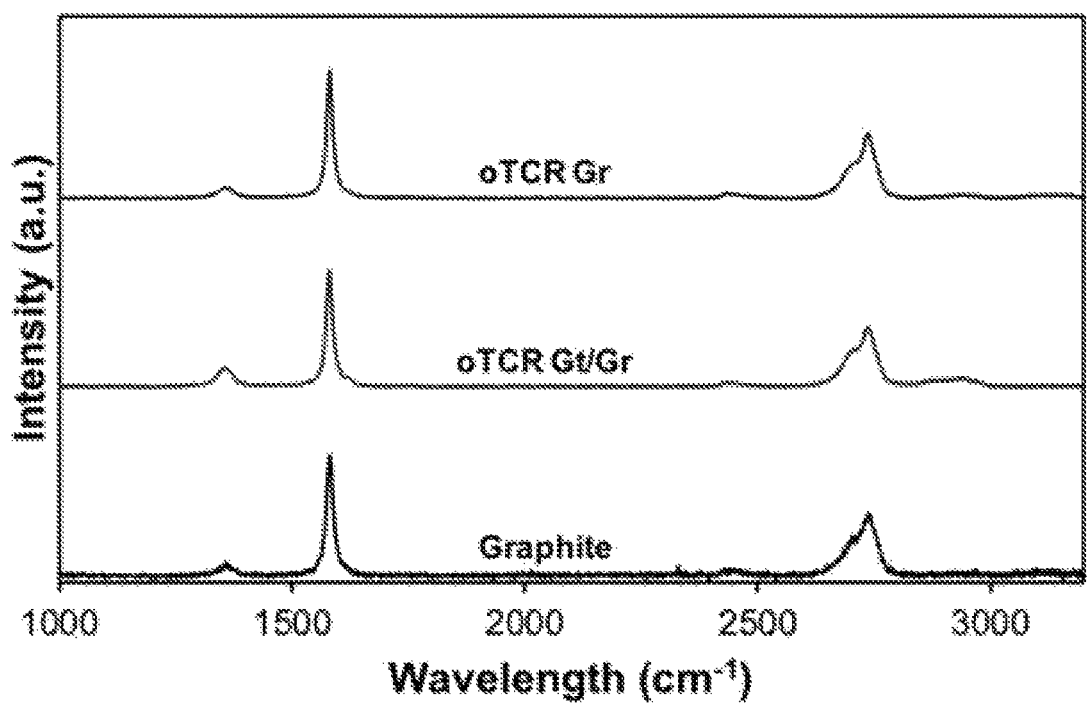
FIG. 19 illustrates Raman spectra of various exemplary graphenic structures provided herein.
Figure 21:
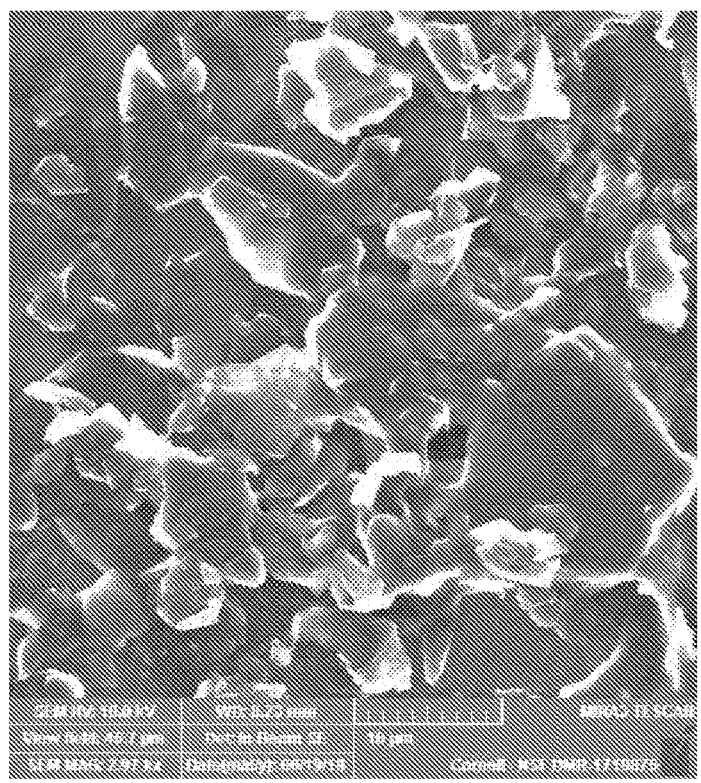
FIG. 21 illustrates an SEM image of an exemplary graphenic structure provided herein.
Figure 22:
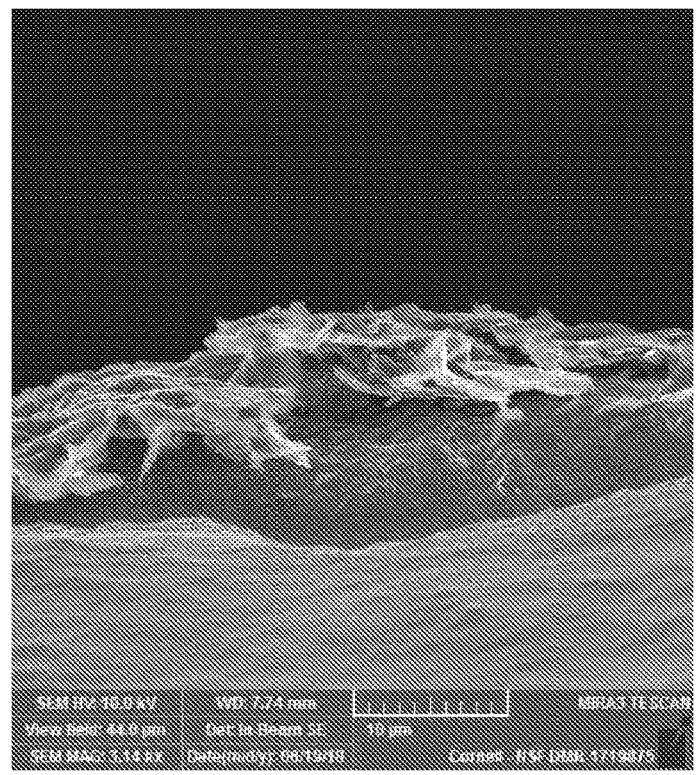
FIG. 22 illustrates a cross-sectional SEM image of a layer of exemplary graphenic structures provided herein.

FIG. 19 illustrates Rama spectrometry traces of the top phase (oTCR Gr), the bottom phase (oTCR Gt/Gr), and unreacted graphite. As can be observed the top phase has a substantial D band, indicating multi-layered graphene production. FIG. 20 illustrates a plot of the $I_D/I_G$ and $I_{2D}/I_G$ ratios relative the top phase, the bottom phase and unreacted graphite. The graphene of the top phase are electrosprayed and observed by scanning electron microscopy (SEM), as illustrated in FIG. 21. As illustrated in FIG. 22, SEM cross-sections of the graphene demonstrates that multi-layered graphene is obtained and stacked during deposition.

What is claimed is:

1. A process for manufacturing a graphenic compound the process comprising:
   a. injecting a first stock into a first inlet of a continuous or semi-continuous reactor, the first stock comprising graphite and optionally one or more additives comprising a surfactant and/or thickening agent,
   wherein the continuous or semi-continuous reactor has a flow from the first inlet to the outlet, the flow being a non-vortex flow, or the continuous reactor is configured to produce a helical laminar or cylindrical Couette flow; and
   b. collecting the graphenic compound from an outlet of the continuous or semi-continuous reactor, the graphenic compound being collected downstream from the first inlet, and wherein the graphenic compound comprises:
      i) graphene, wherein at least 50% of the graphite is converted to graphene;
      ii) only graphene oxide collected after 1 minute comprising less than 1 wt. % graphite; or
      iii) reduced graphene oxide having a C/O atomic ratio of at least 10.

2. The process of claim 1, wherein the non-vortex flow is a helical non-vortex flow.

3. The process of claim 1, wherein the flow is a high shear flow with a shear rate of at least 1,000 1/s.

4. The process of claim 1, wherein the continuous reactor is a continuous Taylor-Couette reactor.

5. The process of claim 1, wherein the continuous reactor comprises a reactor chamber into which the first stock is injected; the reactor-chamber being configured between an outer surface of a cylindrical body and an inner surface of a cylindrical bore, one or both of the cylindrical body and/or cylindrical bore configured to rotate around an axis thereof during manufacture of the graphenic compound.

6. The process of claim 5, wherein the cylindrical body, or the outer surface of the cylindrical body, and the cylindrical bore, or the inner surface of the cylindrical bore, are configured to rotate in opposite directions during manufacture of the graphenic compound.

7. The process of claim 5, wherein the outer surface of the cylindrical body forms an elliptical or oval cylinder.

8. The process of claim 7, wherein the cylindrical body is configured to rotate during manufacture of the graphenic compound.

9. The process of claim 8, wherein the cylindrical bore, or an inner surface of the cylindrical bore, is stationary during manufacture of the graphenic compound.

10. The process of claim 1, wherein the continuous reactor comprises a reactor chamber into which the first stock is injected, the reactor chamber being defined between an outer surface of a cylindrical body and an inner surface of a cylindrical bore, wherein the cylindrical body is a circular cylinder and the cylindrical bore is a circular cylinder.

11. The process of claim 10, wherein the cylindrical bore, or the inner surface thereof, is configured to rotate during manufacture of the graphenic compound.

12. The process of claim 10, wherein the cylindrical body or surface thereof is stationary.

13. The process of claim 1, wherein the first stock further comprises a surfactant and/or stabilizer.

14. The process of claim 1, wherein the graphene is not fully exfoliated.

15. The process of claim 1, wherein the graphene comprises more than one graphene sheet, on average.

16. The process of claim 1, wherein the first stock comprises graphite in a concentration of about 0.1 wt. % to about 50 wt. %.

17. The process of claim 1, wherein the first stock is aqueous.

18. The process of claim 1, further comprising injecting one or more reagent into a second inlet of the continuous or semi-continuous reactor.

19. The process of claim 1, wherein the collected graphenic compound has substantially no graphite.

20. The process of claim 1, wherein the continuous or semi-continuous reactor is a toroidal or helical reactor configured to convert graphite into graphene with a conversion rate of at least 50%.

21. The process of claim 20, wherein the reactor comprises an inner cylinder body and an outer cylinder body wherein the outer cylinder body is configured to rotate to form non-vortex toroidal flow conditions in the reactor.

22. The process of claim 1, wherein the continuous or semi-continuous reactor is a toroidal or helical reactor configured to produce a Couette flow or Taylor vortex flow to convert graphite to substantially uniform graphene oxide with substantially no graphite component observed in 1-10 minutes.

23. The process of claim 1, wherein graphenic compounds have a lateral dimension of at least 60% the size of the injected graphite.

24. A process for manufacturing a graphenic compound the process comprising:

a. injecting a first stock into a first inlet of a continuous reactor, the first stock comprising graphite and optionally one or more additives comprising a surfactant and/or thickening agent, wherein the continuous reactor is a continuous Taylor-Couette reactor; and
b. collecting the graphenic compound from an outlet of the continuous reactor, the graphenic compound being collected downstream from the first inlet, and wherein the graphenic compound comprises:
 i) graphene, wherein at least 50% of the graphite is converted to graphene;
 ii) only graphene oxide collected after 1 minute comprising less than 1 wt. % graphite; or
 iii) reduced graphene oxide having a C/O atomic ratio of at least 10.

25. The process of claim 24, wherein the graphenic compound comprises graphene, wherein at least 50% of the graphite is converted to graphene.

26. The process of claim 25, wherein the graphenic compound comprises only graphene oxide collected after 1 minute comprising less than 1 wt. % graphite.

27. The process of claim 26, wherein the graphenic compound comprises reduced graphene oxide having a C/O atomic ratio of at least 10.

28. A process for manufacturing a graphenic compound the process comprising:

a. injecting a first stock into a first inlet of a continuous reactor, the first stock comprising graphite and optionally one or more additives comprising a surfactant and/or thickening agent, wherein the continuous reactor comprises a reactor chamber into which the first stock is injected; the reactor-chamber being configured between an outer surface of a cylindrical body and an inner surface of a cylindrical bore, one or both of the cylindrical body and/or cylindrical bore configured to rotate around an axis thereof during manufacture of the graphenic compound; and
b. collecting the graphenic compound from an outlet of the continuous reactor, the graphenic compound being collected downstream from the first inlet, and wherein the graphenic compound comprises:
 i) graphene, wherein at least 50% of the graphite is converted to graphene;
 ii) only graphene oxide collected after 1 minute comprising less than 1 wt. % graphite; or
 iii) reduced graphene oxide having a C/O atomic ratio of at least 10.

29. The process of claim 28, wherein the graphenic compound comprises graphene, wherein at least 50% of the graphite is converted to graphene.

30. The process of claim 29, wherein the graphenic compound comprises only graphene oxide collected after 1 minute comprising less than 1 wt. % graphite.

31. The process of claim 30, wherein the graphenic compound comprises reduced graphene oxide having a C/O atomic ratio of at least 10.

32. The process of claim 28, wherein the outer surface of the cylindrical body forms an elliptical or oval cylinder.

33. The process of claim 32, wherein the graphenic compound comprises graphene, wherein at least 50% of the graphite is converted to graphene.

34. The process of claim 33, wherein the graphenic compound comprises only graphene oxide collected after 1 minute comprising less than 1 wt. % graphite.

35. The process of claim 34, wherein the graphenic compound comprises reduced graphene oxide having a C/O atomic ratio of at least 10.

36. A process for manufacturing a graphenic compound the process comprising:
  a. injecting a first stock into a first inlet of a continuous reactor, the first stock comprising graphite and optionally one or more additives comprising a surfactant and/or thickening agent, wherein the continuous reactor comprises a reactor chamber into which the first stock is injected, the reactor chamber being defined between an outer surface of a cylindrical body and an inner surface of a cylindrical bore, wherein the cylindrical body is a circular cylinder and the cylindrical bore is a circular cylinder; and
  b. collecting the graphenic compound from an outlet of the continuous reactor, the graphenic compound being collected downstream from the first inlet, and wherein the graphenic compound comprises:
    i) graphene, wherein at least 50% of the graphite is converted to graphene;
    ii) only graphene oxide collected after 1 minute comprising less than 1 wt. % graphite; or
    iii) reduced graphene oxide having a C/O atomic ratio of at least 10.

37. The process of claim 36, wherein the graphenic compound comprises graphene, wherein at least 50% of the graphite is converted to graphene.

38. The process of claim 37, wherein the graphenic compound comprises only graphene oxide collected after 1 minute comprising less than 1 wt. % graphite.

39. The process of claim 38, wherein the graphenic compound comprises reduced graphene oxide having a C/O atomic ratio of at least 10.

40. A process for manufacturing a graphenic compound the process comprising:
  a. injecting a first stock into a first inlet of a continuous or semi-continuous reactor, the first stock comprising graphite and optionally one or more additives comprising a surfactant and/or thickening agent, wherein the first stock comprises graphite in a concentration of about 0.1 wt. % to about 50 wt. %; and
  b. collecting the graphenic compound from an outlet of the continuous or semi-continuous reactor, the graphenic compound being collected downstream from the first inlet, and wherein the graphenic compound comprises:
    i) graphene, wherein at least 50% of the graphite is converted to graphene;
    ii) only graphene oxide collected after 1 minute comprising less than 1 wt. % graphite; or
    iii) reduced graphene oxide having a C/O atomic ratio of at least 10.

41. The process of claim 40, wherein the graphenic compound comprises graphene, wherein at least 50% of the graphite is converted to graphene.

42. The process of claim 41, wherein the graphenic compound comprises only graphene oxide collected after 1 minute comprising less than 1 wt. % graphite.

43. The process of claim 42, wherein the graphenic compound comprises reduced graphene oxide having a C/O atomic ratio of at least 10.

44. A process for manufacturing a graphenic compound the process comprising:
  a. injecting a first stock into a first inlet of a continuous or semi-continuous reactor, the first stock comprising graphite and optionally one or more additives comprising a surfactant and/or a thickening agent, wherein the first stock is aqueous; and
  b. collecting the graphenic compound from an outlet of the continuous or semi-continuous reactor, the graphenic compound being collected downstream from the first inlet, and wherein the graphenic compound comprises:
    i) graphene, wherein at least 50% of the graphite is converted to graphene;
    ii) only graphene oxide collected after 1 minute comprising less than 1 wt. % graphite; or
    iii) reduced graphene oxide having a C/O atomic ratio of at least 10.

45. The process of claim 44, wherein the graphenic compound comprises graphene, wherein at least 50% of the graphite is converted to graphene.

46. The process of claim 45, wherein the graphenic compound comprises only graphene oxide collected after 1 minute comprising less than 1 wt. % graphite.

47. The process of claim 46, wherein the graphenic compound comprises reduced graphene oxide having a C/O atomic ratio of at least 10.

48. A process for manufacturing a graphenic compound the process comprising:
  a. injecting a first stock into a first inlet of a continuous or semi-continuous reactor, the first stock comprising graphite and optionally one or more additives comprising a surfactant and/or thickening agent, and injecting one or more reagent into a second inlet of the continuous or semi-continuous reactor; and
  b. collecting the graphenic compound from an outlet of the continuous or semi-continuous reactor, the graphenic compound being collected downstream from the first inlet, and wherein the graphenic compound comprises:
    i) graphene, wherein at least 50% of the graphite is converted to graphene;
    ii) only graphene oxide collected after 1 minute comprising less than 1 wt. % graphite; or
    iii) reduced graphene oxide having a C/O atomic ratio of at least 10.

49. The process of claim 48, wherein the graphenic compound comprises graphene, wherein at least 50% of the graphite is converted to graphene.

50. The process of claim 49, wherein the graphenic compound comprises only graphene oxide collected after 1 minute comprising less than 1 wt. % graphite.

51. The process of claim 50, wherein the graphenic compound comprises reduced graphene oxide having a C/O atomic ratio of at least 10.

52. A process for manufacturing a graphenic compound the process comprising:
  a. injecting a first stock into a first inlet of a continuous or semi-continuous reactor, the first stock comprising graphite and optionally one or more additives comprising a surfactant and/or thickening agent, wherein the continuous or semi-continuous reactor is a toroidal or helical reactor configured to convert graphite into graphene with a conversion rate of at least 50%, or the continuous or semi-continuous reactor is a toroidal or helical reactor configured to produce a Couette flow or Taylor vortex flow to convert graphite to substantially uniform graphene oxide with substantially no graphite component observed in 1-10 minutes; and
  b. collecting the graphenic compound from an outlet of the continuous or semi-continuous reactor, the graphenic compound being collected downstream from the first inlet, and wherein the graphenic compound comprises:

i) graphene, wherein at least 50% of the graphite is converted to graphene;
ii) only graphene oxide collected after 1 minute comprising less than 1 wt. % graphite; or
iii) reduced graphene oxide having a C/O atomic ratio of at least 10.

53. The process of claim 52, wherein the graphenic compound comprises graphene, wherein at least 50% of the graphite is converted to graphene.

54. The process of claim 53, wherein the graphenic compound comprises only graphene oxide collected after 1 minute comprising less than 1 wt. % graphite.

55. The process of claim 54, wherein the graphenic compound comprises reduced graphene oxide having a C/O atomic ratio of at least 10.

* * * * *